(12) United States Patent
Stahl

(10) Patent No.: US 11,290,879 B2
(45) Date of Patent: Mar. 29, 2022

(54) METHOD FOR OBTAINING INITIAL ACCESS TO A NETWORK, AND RELATED WIRELESS DEVICES AND NETWORK NODES

(71) Applicant: Telefonaktiebolaget LM Ericsson (publ), Stockholm (SE)

(72) Inventor: Per Stahl, Klagshamn (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 1036 days.

(21) Appl. No.: 15/739,749

(22) PCT Filed: Jul. 2, 2015

(86) PCT No.: PCT/EP2015/065127
§ 371 (c)(1),
(2) Date: Dec. 24, 2017

(87) PCT Pub. No.: WO2017/001022
PCT Pub. Date: Jan. 5, 2017

(65) Prior Publication Data
US 2018/0206117 A1    Jul. 19, 2018

(51) Int. Cl.
*H04W 12/06* (2021.01)
*H04L 29/06* (2006.01)
(Continued)

(52) U.S. Cl.
CPC ........... *H04W 12/06* (2013.01); *H04L 9/0643* (2013.01); *H04L 9/0844* (2013.01); *H04L 9/14* (2013.01);
(Continued)

(58) Field of Classification Search
CPC ..... H04W 12/06; H04W 12/08; H04W 12/04; H04L 9/0643; H04L 9/14
(Continued)

(56) References Cited

U.S. PATENT DOCUMENTS 6,259,790 B1 * 7/2001 Takagi .................... H04L 9/302
380/28
7,549,048 B2    6/2009 Freeman et al.
(Continued)

FOREIGN PATENT DOCUMENTS

CN    102362269 A    2/2012
CN    102754361 A    10/2012
(Continued)

OTHER PUBLICATIONS

Hecker, Artur et al. "A New Access Control Solution for a Multi-Provider Wireless Environment." Telecommunication systems 29.2 (2005): 131-152. (Year: 2005).*
(Continued)

*Primary Examiner* — Thanhnga B Truong
*Assistant Examiner* — Angela R Holmes
(74) *Attorney, Agent, or Firm* — Leffler Intellectual Property Law, PLLC

(57) ABSTRACT

This disclosure provides a method, performed in a wireless device, for obtaining initial access to a network in order to establish a connection to a server connected to the network. The wireless device stores a device public key and a device private key. The server stores the device public key. The method comprises transmitting an initial access request to a network node of the network and receiving an authentication request from the network node, the authentication request comprising a challenge. The method comprises generating a device authenticator based on the challenge and the device public key, and transmitting an authentication response to the network node. The authentication response comprises the device authenticator. The method comprises receiving an initial access response from the network node, the initial access response comprising an indicator of whether the initial access is granted or denied.

39 Claims, 8 Drawing Sheets

(51) Int. Cl.
*H04W 12/30* (2021.01)
*H04W 12/0431* (2021.01)
*H04L 9/06* (2006.01)
*H04L 9/08* (2006.01)
*H04L 9/14* (2006.01)
*H04L 9/30* (2006.01)
*H04L 9/32* (2006.01)
*H04W 12/04* (2021.01)
*H04W 12/08* (2021.01)
*H04W 12/12* (2021.01)

(52) U.S. Cl.
CPC .............. *H04L 9/30* (2013.01); *H04L 9/3242* (2013.01); *H04L 9/3263* (2013.01); *H04L 9/3271* (2013.01); *H04L 63/0823* (2013.01); *H04W 12/04* (2013.01); *H04W 12/0431* (2021.01); *H04W 12/08* (2013.01); *H04W 12/35* (2021.01); *H04L 63/0442* (2013.01); *H04W 12/12* (2013.01)

(58) Field of Classification Search
USPC .......................................................... 713/171
See application file for complete search history.

(56) References Cited

U.S. PATENT DOCUMENTS

| | | | |
|---|---|---|---|
| 7,756,509 B2 | 7/2010 | Rajagopalan et al. | |
| 8,621,203 B2* | 12/2013 | Ekberg | H04W 12/06 713/156 |
| 8,874,914 B2 | 10/2014 | Stauth et al. | |
| 2003/0200433 A1* | 10/2003 | Stirbu | H04L 9/3271 713/169 |
| 2007/0060106 A1* | 3/2007 | Haverinen | H04W 12/06 455/410 |
| 2010/0023760 A1 | 1/2010 | Lee et al. | |
| 2011/0004762 A1* | 1/2011 | Horn | H04W 12/06 713/171 |
| 2011/0138380 A1 | 6/2011 | Sharaga | |
| 2011/0185397 A1 | 7/2011 | Escott et al. | |
| 2011/0305338 A1 | 12/2011 | Rogan | |
| 2012/0102546 A1 | 4/2012 | Jiang et al. | |
| 2012/0239936 A1 | 9/2012 | Holtmanns et al. | |
| 2013/0046976 A1* | 2/2013 | Rosati | H04W 12/069 713/168 |
| 2013/0246281 A1* | 5/2013 | Yamada | H04L 9/3231 705/71 |
| 2013/0246792 A1* | 9/2013 | Lambert | H04L 9/0866 713/168 |
| 2013/0305330 A1 | 11/2013 | Palanigounder | |
| 2014/0298016 A1* | 10/2014 | Ekberg | H04L 9/14 713/168 |
| 2015/0095648 A1 | 4/2015 | Nix | |
| 2016/0180072 A1* | 6/2016 | Ligatti | G06F 21/34 726/7 |
| 2016/0219043 A1* | 7/2016 | Blanke | G06F 21/33 |
| 2021/0117635 A1 | 4/2021 | Yeakley | |

FOREIGN PATENT DOCUMENTS

| | | |
|---|---|---|
| CN | 103583060 A | 2/2014 |
| CN | 103621040 A | 3/2014 |
| WO | 2006084183 A1 | 8/2006 |
| WO | 2008128873 A1 | 10/2008 |
| WO | 2012162843 A1 | 12/2012 |
| WO | 2015036773 A2 | 3/2015 |

OTHER PUBLICATIONS

PCT International Search Report, dated Mar. 2, 2016, in connection with International Application No. PCT/EP2015/065127, all pages.
PCT Written Opinion, dated Mar. 2, 2016, in connection with International Application No. PCT/EP2015/065127, all pages.
Exalted: WP5—Security, Authentication & Provisioning, Deliverable 5.1 Security and Provisioning Solutions, Feb. 29, 2012, 115 pages.
Satyanarayana Vuppala et al., D2.1—Requirements, Specifications and Security Technologies for IoT Context-Aware Networks, Butler Smartlife, Oct. 31, 2012, pp. 1-171.
3GPP TR 33.812 V9.2.2, Jun. 2010, 3rd Generation Partnership Project; Technical Specification Group Services and System Aspects; Feasibility study on the security aspects of remote provisioning and change of subscription for Machine to Machine (M2M) equipment, Release 9, 87 pages.
Chinese Office Action dated Apr. 14, 2020 in connection with Chinese Application No. 201580082851.8, 11 pages.
English language translation of Chinese Office Action dated Apr. 14, 2020 in connection with Chinese Application No. 201580082851.8, 4 pages.
European Communication dated Nov. 11, 2020 in connection with European Application No. 15739198.8, 7 pages.
Unknown, Public Key Fingerprint—Wikipedia, Jun. 15, 2015, XP055747246, retrieved on Nov. 5, 2020, https://en.wikipedia.org/w/index.php?title=Public_key_fingerprint&oldid=667068485, 4 pages.
India Office Action dated Oct. 21, 2020 in connection with India Application No. 201847003564, 6 pages.
Gustafson et al., "Securely Available Credentials (SACRED)—Credential Server Framework", Network Working Group, RSA Security, Apr. 2004, pp. 1-22.
Menezes, A., et al., "Handbook of Applied Cryptography", Aug. 31, 2001, pp. Title page, Table of Contents on v-xiii, 283-285 [08.1], 364 [9.6.3]-[9.6.4], 403-405 [10.3.3], 515-520 [12.6.1], retrieved on Feb. 10, 2016, retrieved from Internet: http://lcacr.uwaterloo.ca/hac/, 25 pages.

* cited by examiner

METHOD FOR OBTAINING INITIAL ACCESS TO A NETWORK, AND RELATED WIRELESS DEVICES AND NETWORK NODES

TECHNICAL FIELD

The present disclosure relates to security and in particular to initial network access. More specifically, the present disclosure relates to a method for obtaining initial access to a network, and to related wireless devices and network nodes.

BACKGROUND

It is envisioned that 50 billion devices will be connected to the Internet in 2020 and that the Internet Of Things, IoT, where wireless devices such as sensors, light bulbs, etc. are connected, will be a major part of the connected devices.

Security is very important for these wireless devices. For example, it is important to make sure that data delivered from sensors ends up in the right hands and that it has not been tampered with, and that sensitive data from these sensors is not exposed.

Another example is the need to prevent tampering of data sent to and from control devices such as door locks or pacemakers, for which tampering could have serious consequences on people's properties or health. Not only should the wireless device itself and the service provided by the wireless device be protected (e.g. secure communication between the wireless device and server to which the wireless device delivers sensitive sensor data), but also device management (such as SW update and configuration of the device) and service registration and enablement needs to be handled in a secure manner. Hence, it is important to prevent that a man-in-the-middle manipulates the SW, puts the wireless device into a faulty/unsecure configuration, or makes the wireless device register to a rogue server.

In IoT, wireless devices are typically constrained devices with limited computing and communication power and memory. For such wireless devices, several standards have been proposed in various standardization forums. One of these standards is the lightweight machine to machine, LwM2M, protocol that provides means for bootstrapping, registration, management, service enablement, and information reporting of constrained wireless devices. The LwM2M protocol runs on top of constrained application protocol, CoAP, which is a representation state transfer, REST-ful application protocol for constrained devices standardized by IETF. Both LwM2M and CoAP mandate the use of datagram transport layer security, DTLS for secure communication including mutual authentication between a wireless device and a server (bootstrapping server, device management server, or data reporting server).

CoAP and LwM2M specifications describe three modes in which DTLS is to be used and specify mandatory DTLS cipher suites to be used:
  DTLS with pre-shared key: a pre-shared key between the wireless device and the server is used.
  DTLS with public-private key pairs in raw-public-key, RPK, mode: both wireless device and server has an individual public-private elliptic curve cryptographic key pair used for mutual authentication and the RPK format is used to transfer keys between the IoT device and the server in order to avoid certificates and save memory and processing power in the wireless devices.
  DTLS with certificates: both wireless device and server has individual public-private elliptic curve cryptographic key pairs and corresponding certificates certifying their public keys. Private keys and certificates are used for mutual authentication.

To allow the constrained wireless device to establish DTLS session with different servers in any of these modes, it is necessary to provide credentials to the constrained wireless device such as a pre-shared key, a public-private key pair, and certificates. However, the constrained wireless device very often lacks interface and display for the user/enterprise that owns the device to be able to manually configure the wireless devices with credentials. Often, the only interface is the network interface. In many cases, the user/enterprise buys hundreds or thousands of wireless devices and then manual configuration of each device is too time consuming. Often, the wireless device may have been pre-configured with some credentials at the manufacturer of the wireless device but still need to be provided with device credentials that support the wireless device in securely operating in the user/enterprise network.

However, to securely obtain device credentials, the wireless device needs to gain initial network access to a communication network e.g. a LTE network, so as to connect to the enterprise network. To secure the initial network access, the network needs to at least authenticate the wireless device using the access network authentication protocol. There exist many different access network authentication protocols depending on the type of network accessed. A protocol achieving such a secure connection needs to be as lightweight as possible to be supported by the wireless devices in IoT and needs to be interoperable with the variety of networks.

WO2008/128873 provides methods and systems that allow mobile device manufacturers to preconfigure mobile devices for subscription with any network operator having access to a centralized device directory server. The directory server stores device records, each including a preliminary subscription identity. Manufacturers individually provision new mobile devices with these preliminary subscription identities, and network operators preliminarily register subscribers by submitting requests to the directory server that cause it to link individual device records with the appropriate credential server addresses. Mobile devices gain temporary network access by submitting their preliminary subscription identities, which get passed along to the directory server for verification. In turn, the directory server generates authentication vectors giving the mobile devices temporary network access, and returns the appropriate credential server addresses. The mobile devices use the address information to submit secure requests for permanent subscription credentials, and the involved credential servers securely return permanent subscription credentials responsive to valid requests. Having a dedicated preliminary or temporary cryptographic material is a sub-optimal solution for wireless devices where resources are constrained and the amount or number of cryptographic material is to be kept to a minimum. WO2008/128873 is only concerned with the initial network access of the wireless device for cellular systems and does not address the interworking across a variety of networks.

Hence, there is a need for a lightweight security protocol that provides a wireless device with initial access to a variety of networks.

SUMMARY

An object of the present disclosure is to provide methods, wireless devices, and servers which seek to mitigate, alleviate, or eliminate one or more of the above-identified deficiencies in the art and disadvantages singly or in any combination.

This object is obtained by a method, performed in a wireless device, for obtaining initial access to a network in order to establish a connection to a server connected to the network. The wireless device stores a device public key and a device private key. The server stores the device public key. The method comprises transmitting an initial access request to a network node of the network and receiving an authentication request from the network node, the authentication request comprising a challenge. The method comprises generating a device authenticator based on the challenge and the device public key, and transmitting an authentication response to the network node. The authentication response comprises the device authenticator. The method comprises receiving an initial access response from the network node, the initial access response comprising an indicator of whether the initial access is granted or denied.

The present disclosure provides a lightweight technique for obtaining initial network access for a wireless device attaching a network that may be a home or a visited network using an already provisioned and unexposed device public key as a shared secret. There is thus no need for a temporary/preliminary cryptographic material dedicated to obtain initial network access. The wireless device can then reduce the memory usage for storing cryptographic material and only store the device public key and device private key and still gain initial access to the network (home or visited) so as to e.g. be provisioned with permanent network access credentials.

The object is furthermore obtained by a method, performed in a network node, for providing initial network access to a wireless device. The network node is connected to a first server storing a device public key of the wireless device and to a second server.

The method comprises receiving an initial access request from the wireless device; and determining a device network identifier of the wireless device. The method comprises obtaining, from the second server, authentication data corresponding to the device network identifier. The authentication data comprises a challenge. The method comprises transmitting an authentication request to the wireless device. The authentication request comprises the challenge. The method comprises receiving an authentication response from the wireless device. The authentication response comprises a device authenticator. The method comprises verifying the received authentication response based on the device authenticator and the authentication data; and upon successful verification: transmitting an initial access response to the wireless device.

It is an advantage of the present disclosure that the network node is able to operate in quasi same manner and to accommodate the wireless devices disclosed herein by obtaining authentication data from the second server and thus being able to authenticate the wireless devices disclosed herein for initial access. Furthermore, the disclosed network node method allows the wireless device to request and obtain initial access to a variety of networks independently on whether the network is a home network or a visited network, a wireless local area network or a cellular network.

There is also disclosed herein a wireless device. The wireless device comprises an interface configured to communicate with a server and a network node, a memory unit having a device public key and a device private key stored thereon, and a processor configured to transmit an initial access request to the network node of a network via the interface. The processor is configured to receive, via the interface, an authentication request from the network node. The authentication request comprises a challenge. The processor is configured to generate a device authenticator based on the challenge and the device public key and to transmit, via the interface, an authentication response to the network node. The authentication response comprises the device authenticator. The processor is configured to receive, via the interface, an initial access response from the network node. The initial access response comprises an indicator of whether initial access is granted or denied.

This disclosure also relates to a network node for initial access of a wireless device to a network. The network node comprises a first interface configured to communicate with the wireless device and a second interface configured to communicate with a first server storing a device public key of the wireless device and a second server. The network node comprises a memory unit, and a processor configured to receive, via the first interface, an initial access request from the wireless device. The processor is configured to determine a device network identifier of the wireless device; and to obtain, from the second server, via the second interface, authentication data corresponding to the device network identifier. The authentication data comprises a challenge. The processor is configured to transmit, via the first interface, an authentication request to the wireless device. The authentication request comprises the challenge. The processor is configured to receive, via the first interface, an authentication response from the wireless device. The authentication response comprises a device authenticator. The processor is configured to verify the received authentication response based on the device authenticator and the authentication data; and upon successful verification: to transmit, via the first interface, an initial access response to the wireless device.

In addition to the above methods, wireless device and network nodes, there is also provided herein computer programs comprising computer program code which, when executed in a wireless device, causes the component, to execute methods according to the present teaching.

In addition to the above methods, there is also provided herein computer programs comprising computer program code which, when executed in a network node, causes the network node, to execute methods according to the present teaching.

The computer programs, the wireless devices, and the network nodes provide advantages corresponding to the advantages already described in relation to the methods.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
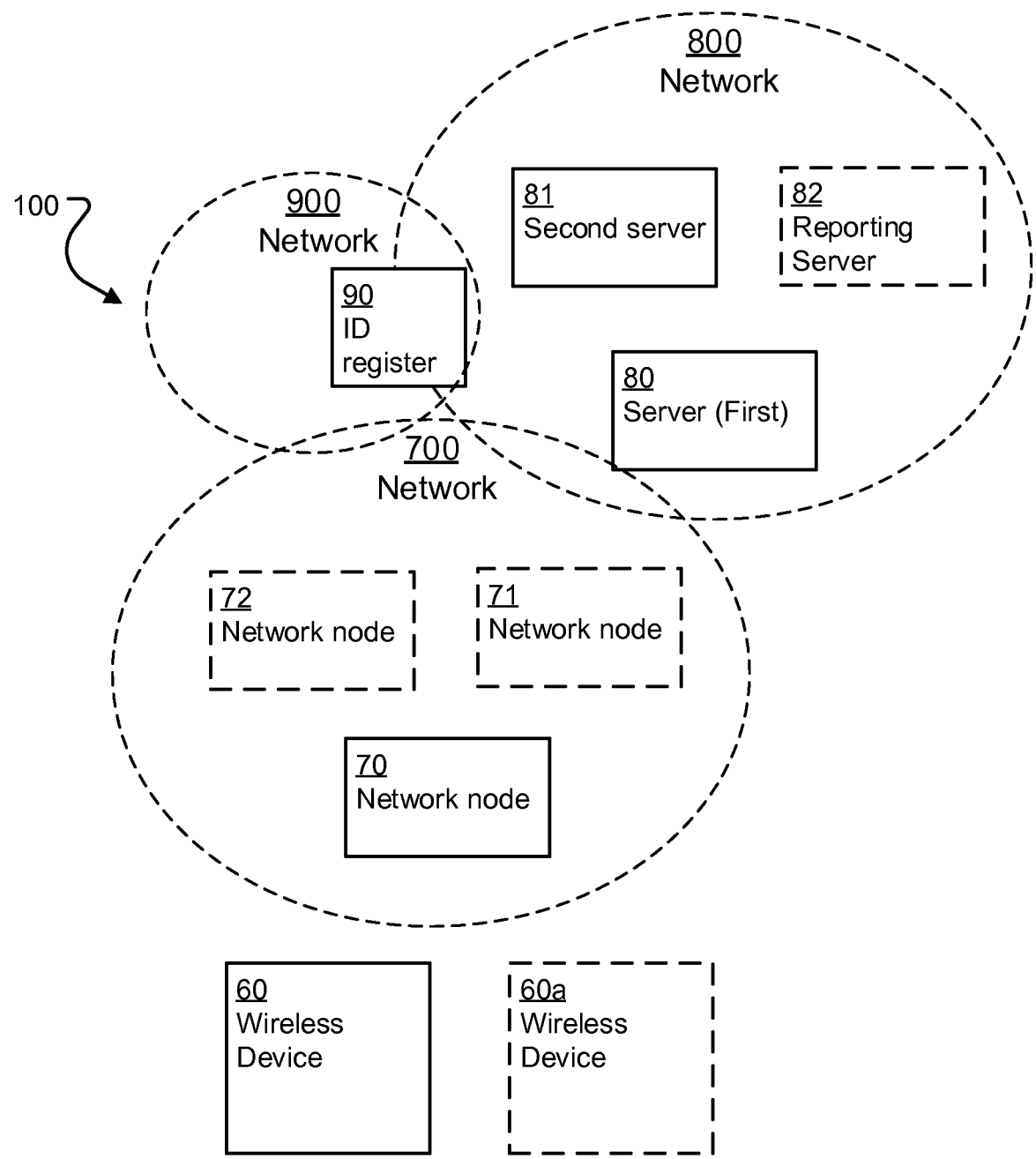
FIG. 1 is a system diagram illustrating an exemplary system, an exemplary wireless device, exemplary server and an exemplary network node according to this disclosure.

The present teaching relates to methods for enabling secure provisioning of credentials to a wireless device from a network; and to related wireless devices and network nodes.

The present technique is applicable to any electronic system as well as to any wireless communication system where there is a need for a lightweight and secure initial network access so as to e.g. obtain device credentials.

The various components referred to herein are according to different aspects implemented as, e.g., application-specific integrated circuit, ASIC, field-programmable logic array, FPGA, or general purpose processor.

As mentioned in the background section, when an enterprise or a user buys a lot of wireless devices from a manufacturer/retailer, the wireless devices are likely to be pre-configured at manufacturing with some credentials, such as a device public-private key pair. The enterprise obtains a list with the public keys and identifiers of all the bought wireless devices, for example on some electronic media (e.g. a CD). It is assumed in this example that the credentials are to be provided for bootstrapping purposes. As the credentials such as a URL of the enterprise bootstrapping server, BS, and keys/certificates for secure communication with the enterprise BS are not known at the time of the manufacturing, the manufacturer cannot provide these credentials into the wireless device at manufacturing. The manufacturer is thus able to provide to the wireless device at manufacturing only the following credentials: a device public-private key pair, and/or a URL of the manufacturer BS. When the wireless device is started up for the first time by the enterprise, the wireless device retrieves the URL of the manufacturer BS from its memory, and attempts to connect to the manufacturer BS. However, to be able to connect with any server, the wireless device has to obtain initial access to a network available in its vicinity. For some wireless devices, a low power cellular modem comprised in the wireless device is expected to be used to get public network access. To keep the cost down such wireless devices are not likely to have a subscriber identity module, SIM, card or even an embedded universal integrated circuit Card, eUICC, or an embedded SIM. The wireless device is likely to support a soft SIM implementation, i.e. a software implementation of the SIM, running on a main processor of the wireless device, and where a security sensitive part of the implementation is likely to run in a secure/trusted environment. An example of such an implementation is a machine communication identity module, MCIM. A relevant scenario is for example when a set of wireless devices are owned and managed entirely by an enterprise and where the enterprise itself runs its own location register and can be seen as the "home" operator of the wireless devices, which has roaming agreements with one or more mobile network operators, MNOs, for the wireless devices to get initial network access, such as cellular access or wireless local area network, WLAN, access.

WO2008/128873, which was introduced in the background section, provides methods and systems that allow mobile device manufacturers to preconfigure mobile devices for subscription with any network operator having access to a centralized device directory server. However WO2008/128873 requires a global organization for setting up and managing the directory server, generating the preliminary subscription details and populate the directory server database, and providing the preliminary subscription details to the mobile device manufacturers. Providing the preliminary subscription details to the device manufacturer before device manufacturing is a problem for an enterprise that wants to buy several hundreds or thousands of devices and have a solution for initial network access. In particular if the enterprise that wants to buy generically configured devices via a retailer instead of buying specifically customized devices (with the preliminary subscription details) directly from the manufacturer, wherein the latter is probably much more expensive. Additionally, the wireless devices to be used in IoT are typically resource-constrained. Therefore, having dedicated/customized preliminary subscription details for the single purpose of initial network access represents a suboptimal usage of the memory.

To secure the initial network access of a wireless device, a network needs to at least authenticate the wireless device using an access network authentication protocol. There are many different access network authentication protocol, used by different types of access network (such as cellular network, WLAN).

For accessing the different types of networks, the wireless devices has to be provided with credentials and algorithms that allow carrying out the various access network authentication for $3^{rd}$ generation partnership project, 3GPP based cellular network access, and/or for WLAN access protocol (such as UMTS authentication and key exchange protocol, AKA, GSM AKA, and extensible authentication protocol, EAP).

The present disclosure proposes to use the device public key as a shared secret to carry out network authentication protocol in order to obtain initial network access. As the device public is not yet exposed to other devices (except, of course, the wireless device and the enterprise BS) or the public (i.e. has not been published or made publicly available) when initiating network access, the device public key can serve as a shared secret between the wireless device and a network node of the network being accessed. After obtaining initial access and securing delivery of the credentials to the wireless device, the device public key can serve as a publicly available device public key (and be exposed). Without knowledge of the device public key, an attacker is unable to trick the network node into accepting a rogue wireless device. Without knowledge of the device public key, an attacker is unable to trick the device into accepting a rogue network node, and thus to perform a man-in-the-middle attack.

The proposed technique is also applicable to securing communication between the wireless device attempting to access a network, and a server e.g. for bootstrapping.

Thus, the present disclosure allows using an already initially provisioned material, i.e. the device public key, as a shared secret to obtain initial access to a network node independently of the nature of the network (i.e. cellular or WLAN). This further enables a secure device management, such as secure provisioning of the credentials to the wireless device from a BS server while maintaining a reduced memory usage for storing credentials. This provides the manufacturer with flexibility in manufacturing the wireless devices as the manufacturer does not have to provision at manufacturing the wireless devices delivered to the enterprise with neither the network access credentials, nor the enterprise credentials nor manufacturer credentials for secure communication with a server via a network node. Hence, this allows for provision and use of generically configured devices.

Aspects of the present disclosure will be described more fully hereinafter with reference to the accompanying drawings. The methods, wireless devices, network nodes disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

As used herein, the term "credential" refers to a cryptographic material that contributes in establishing an identity of a party to a communication, securing the communication to the party, accessing a resource (e.g. a network, a server). A credential comprises a security credential, such as a bootstrapping credential. A credential can be self-issued or issued by a trusted third party. A credential is for example a certificate, a cryptographic key, a biometrics, an identifier and/or a password. Examples of cryptographic keys include a public key, a private key, and/or a symmetric key.

The present technique is applicable to any authentication and key agreement protocol based on a shared key that is adapted according to the present disclosure to use a device public key that has not yet been exposed as the shared key.

The present technique is applicable to any EAP protocol based on a shared key, such as EAP with pre-shared key, EAP-PSK, EAP-transport layer security, TLS, protocol with pre-shared key, EAP-AKA, and/or EAP for GSM Subscriber Identity Module, EAP-SIM, and to any network (wireless or not) where EAP is used for network access authentication. Examples of wireless networks where EAP protocols may be used are WLAN, cellular networks, and IEEE 802.15.4. FIG. 1 shows a system diagram illustrating an exemplary system 100 according to the present disclosure. System 100 comprises a wireless device 60, an identity register 90 and an exemplary (first) server 80, and an exemplary second server 81 according to the present disclosure. Optionally, system 100 comprises an additional wireless device 60a.

In this disclosure, the term "wireless device" used herein refers to a device that has wireless communication capabilities as well as memory and computational capabilities. A wireless device comprises for example user equipment, a mobile terminal, or a fixed terminal. A wireless device may be a device comprising a universal integrated circuit card configured to communicate, and/or a trusted execution environment configured to store credentials and support in the authentication process.

According to some aspects of this disclosure, the wireless device 60 is a resource-constrained device. The term "resource-constrained device" used herein refers to a device that has limited communication capabilities, limited memory, limited computational capabilities, and/or limited battery life. A resource-constrained device is for example an IoT device, and/or a sensor such as a low power sensor. A resource-constrained device may be a device comprising a universal integrated circuit card configured to communicate and/or a trusted execution environment configured to store credentials and support in the authentication process. A resource-constrained device may be a mobile resource-constrained device, or a fixed resource-constrained device. Examples of resource-constrained devices include monitoring implants, biochip transponders, telematics devices, smart home devices, smart thermostat, smart metering devices, and smart appliances. A resource-constrained device has for example such limited resources that the resource-constrained device is unable to independently perform some tasks required to perform an operation, such as a security operation. A resource-constrained device has for example such limited resources that performing such tasks would drain all its resources and would result in the device being non-operational.

In this disclosure, the term "network node" used herein refers to a node or equipment that is attached and belongs to a network or network infrastructure, and that has communication capabilities as well as memory and computational capabilities that support creating, receiving, and/or transmitting information over one or more communications channels. The network node comprises, according to some aspects, a network node of cellular network, such as a base station, a node B, an eNodeB, a base station controller, a radio network control, RNC, and a relay node. The network node comprises, according to some aspects, a gateway and/or a network node of WLAN network, such as a WLAN access point, a WLAN ad hoc node and a WLAN relay node. The network node comprises according to some aspects a master node and/or an intermediary node in an ad hoc mesh network. For example, in an IEEE 802.15.4 based network, the network node is a master node (called Border Router using IPv6 over Low power Wireless Personal Area Networks, 6LoWPAN, Network Discovery, ND, protocol terminology) while the wireless device is a slave node (called host using 6LoWPAN ND terminology). It can be envisaged that the network node belongs to a wireless access network.

The term "identity register" refers to a network entity that stores for each (or at least some of the) wireless device in one or more network a device identifier, a temporary device network identifier and/or a device network identifier. The identity register 90 for example belongs to one or more of the networks 700, 800, 900. The identity register 90 is reachable by a node or server in a connected network, such as by the network node 70, or the second server 81. The identity register 90 can be seen as a central register that supports the network node 70 in obtaining the relevant authentication data from the relevant server. For example, the identity register 90 is initialized with a temporary device network identifier and/or a device network identifier for each registered wireless device, so that a network node is able to query the identity register 90 for the device network identifier which would support the network node in contacting the wireless device's home network for further authentication. For example, the wireless device 60 starts up and finds itself under the coverage of a visited network (such as network 700) other than the wireless device's home network (such as network 800), but which has an agreement with the home network. For example, for identification of the wireless device in a cellular network, the home network (or operator) provides an identity register 90 that a visited network can use to identify the home network of the wireless device. An identity register 90 is according to some aspects a common register accessible to one or more networks (such as one or more home networks and/or one or more visitor networks). According to some aspects, the identity register 90 is local to a network (such as part of a home network or operator) and is used by other networks (such as a visited network or operator) to be able locate the device network identifier of non-provisioned wireless devices for which the device identifier can be used as a device/subscriber identifier when attaching to a network.

The term "server" may be used herein to refer to an apparatus configured to act as a server in a protocol, such as a security protocol, such as a bootstrapping protocol. A server is configured to communicate with the wireless device 60 via a wireless communication interface, and/or a wired communication interface. A wireless device is according to some aspects configured to act as a client, such as a client of the security protocol, such as a client of a transport layer security, TLS, protocol. The term "client" is used to refer to a device configured to act as a client. The client-server characteristic describes the relationship of cooperating apparatuses or programs in an apparatus. A server provides a function or service to one or more clients, which initiate requests for such functions or services. A client, such as the wireless device 60, 60a, and a server, such as the first server 80, exchange messages in a request-response messaging pattern: the client sends e.g. a request, and the server returns e.g. a response. A client and/or a server may comprise a user equipment, a network equipment and/or a peer in a peer-to-peer system. Alternatively, a client is a user equipment while a server is a node within the network infrastructure. The wireless device 60, 60a and the first server 80 are for example apparatuses configured to act as a client/server of a protocol, such as a security protocol, and/or a bootstrapping protocol The server 80, here referred to as the first server 80, comprises according to some aspects a device management server, such as a bootstrapping server. The first server 80 belongs for example to a first network 800. For each wireless device, the enterprise or the server 80 derives a shared secret K from the device public key by calculating the hash of the public key concatenated with an arbitrary string. The shared secret can be derived in the following way e.g.:

$$K = \text{truncate}(H(\text{device public key}|\text{arbitrary string}), n) \quad (1)$$

where H denotes a hash function, n denotes a size in which the hash value is to be truncated (such as 128 bits preferably used for constrained wireless devices).

Keying material comprising the shared secret K and/or keys derived from the shared secret are given to an entity in the enterprise/home network (such as a second server 81 in network 800). Such entity assigns the keying material with a device network identifier (such as a 3GPP international mobile subscriber identity, IMSI) and registers/stores the device network identifier and the keying material along with other suitable parameters. The enterprise or an entity in the enterprise network (such as a BS server, or a first server 80 in network 800) also computes a device identifier based on the device public key and gives the device identifier to the second server 81 in network 800. The second server 81 registers the device identifier with the device network identifier assigned for each wireless device in an identity register 90. The second server 81 generates credentials for (more permanent) network access for each wireless device (such as soft SIM credential) and delivers them to the enterprise that configures this information into the first server 80.

The second server 81 comprises according to some aspects an authentication server, a home location register, HLR, a home subscriber system, HSS, a gateway GPRS support node, GGSN, a serving GPRS support node, SGSN, and IP based multimedia subsystem, IMS, function. The first server 80 and the second server 81 are the same server according to some aspects. The first server 80 and the second server 81 may belong to the same network 700 as the network node or to a different network. The network 700, the first network 800, and the second network 900 are according to some aspects the same network or different networks. The second network 900 comprises for example an identity register 90.

According to some aspects, the wireless device 60 connects with the network 700, 800 for bootstrapping, registration, management, service enablement, and information reporting. The network 700, 800 comprises one or more servers configured to manage, control and/or support the wireless device 60, such as a (first) server 80, a second server 81 and optionally a reporting server 82. The first server 80 and/or the second server 81 comprises for example a bootstrapping server, an authentication center server, an authentication authorization and accounting server, a management server, an HLR. A wireless device for example communicates with one server for device management and service enablement and at least with one more servers for the service (e.g. sensor data reporting). A server has more resources, such as communication capabilities, power, memory and a computational capability, than a wireless device that is resource-constrained. The network node 70 comprises a server of the manufacturer (such a manufacturer BS), and a server of the enterprise network (such as an enterprise BS). A server is configured to communicate with the wireless device 60 via a wireless communication interface, and/or a wired communication interface. A wireless device is according to some aspects configured to act as a client, such as a client of the security protocol, such as a client of a transport layer security, TLS, protocol. The term "client" is used to refer to a device configured to act as a client. The term "server" may be used to refer to an apparatus configured to act as a server in a protocol, such as a security protocol, such as a bootstrapping protocol. The client-server characteristic describes the relationship of cooperating apparatuses or programs in an apparatus. A server provides a function or service to one or more clients, which initiate requests for such functions or services. A client, such as the wireless device 60, 60a, and a server, such as the network node 70, exchange messages in a request-response messaging pattern: the client sends e.g. a request, and the server returns e.g. a response. A client and/or a server may comprise a user equipment, a network equipment and/or a peer in a peer-to-peer system. Alternatively, a client is a user equipment while a server is a network node. The wireless device 60, 60a and the network node 70 are for example apparatuses configured to act as a client/server of a protocol, such as a security protocol, and/or a bootstrapping protocol.

According to some aspects, the network 700, 800, 900 is a home network, an enterprise network and/or a visited network. According to some aspects, the network 700, 800, 900 comprises a local area network, an access network, a core network, a metropolitan area network, a body area network and/or a personal area network. According to some aspects, the network 700, 800, 900 comprises a wired communication network, and/or a wireless communication network. A wired communication network comprises e.g. an Internet protocol-based communication network, a fiber-optic communication network, a telephone network, and/or a cable network. A wireless communication network comprises for example a short range communication network (e.g. Bluetooth, ZigBee, near field communication, IEEE 802.15), a wireless local area network, WLAN, and/or a cellular network such as groupe special mobile, GSM, 3GPP universal mobile telecommunication system, UMTS, long term evolution, LTE, system. An enterprise usually purchases a number of wireless devices 60, 60a from a manufacturer. The enterprise operates an enterprise network that, among other task, manages the wireless devices 60, 60a. The enterprise network is for example a home operator of its wireless devices and has roaming agreements with mobile network operators, MNOs, to provide access to the wireless devices 60, 60a when under the coverage of networks of such MNOs. In FIG. 1, it can be envisaged that the network 700 is for example a visited network of MNOs, the network 800 is a home network, and the network 900 is accessible using Internet. In FIG. 1, it can also be envisaged that the network 700 is for example an access network part of an enterprise cellular network and the network 800 is an enterprise core network.

Figure 2:
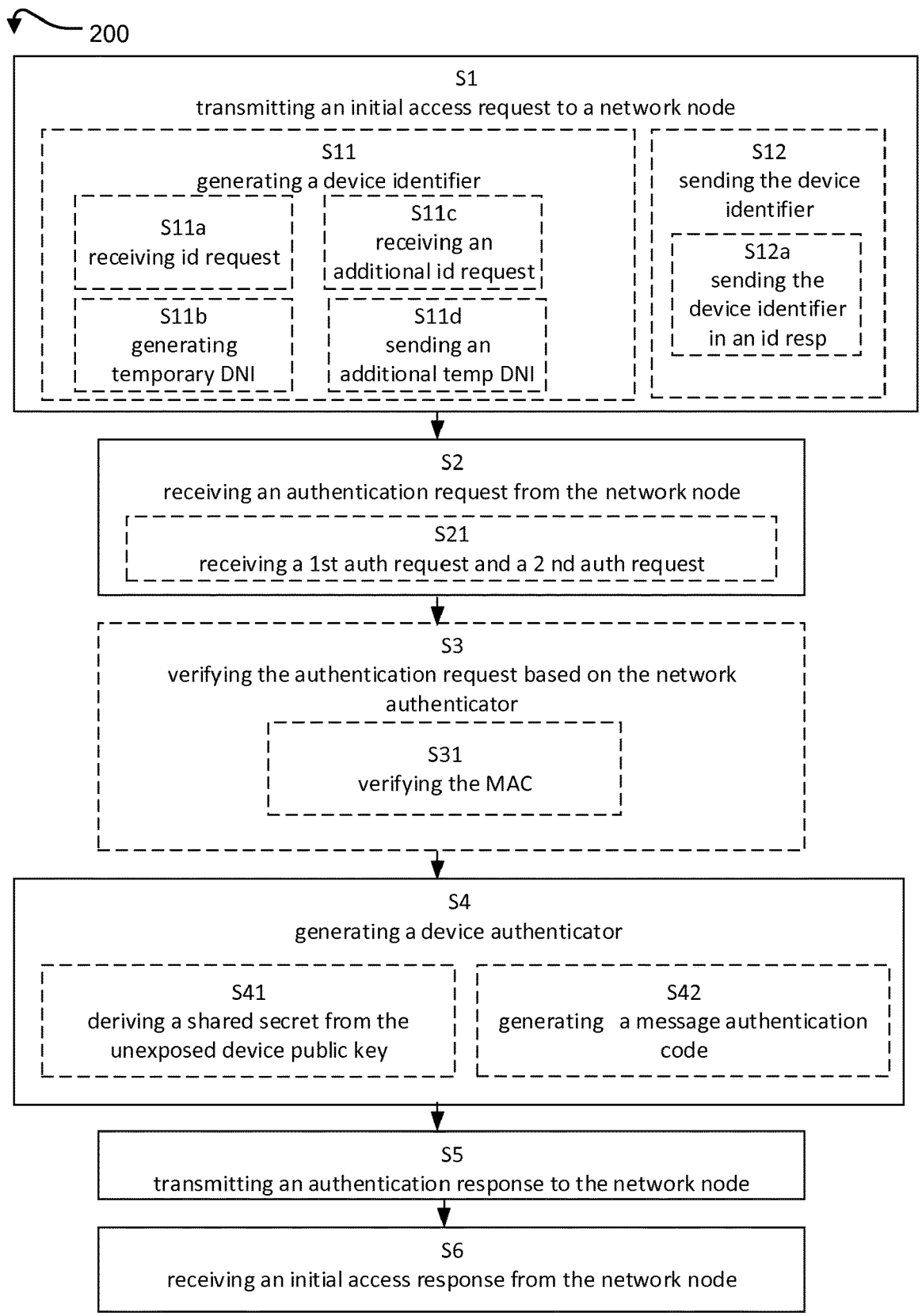
FIG. 2 is a flow chart illustrating an exemplary method, performed in a wireless device according to this disclosure.

FIG. 2 shows a flowchart illustrating exemplary methods 200 performed in a wireless device according to some aspects of this disclosure. For example, an enterprise purchases wireless devices 60, 60a from a manufacturer. The manufacturer has upon purchase, provided the enterprise with the device public key, and possibly a device identifier. The enterprise then provides the device public key, and possibly the device identifier for each purchased wireless device 60 to a server 80 of the enterprise. When the wireless device 60, 60a starts up for the first time, the wireless device needs to obtain initial access to the network available so as to be provided with credentials that allows the wireless device 60, 60a to operate with the enterprise network. The wireless devices 60, 60a may or may not be configured with the credentials of the manufacturer BS and/or enterprise BS for secure communication including authentication between the wireless device and the BS. Typically, enterprise credentials are not configured/provisioned in the wireless device. The device public key has not been made public by the wireless device, by the enterprise and/or by any other possible holder of the device public key. To obtain initial access to the network 700, 800, the wireless device 60 is configured to perform methods 200. It is assumed that the device public key of the wireless device is delivered from the manufacturer to the enterprise in a secure manner such that the device public keys is not exposed before being used in obtaining initial network access and/or credential provisioning. Methods 2 are performed in a wireless device 60. Methods 200 are for obtaining initial access to a network 700, 800 in order to establish a connection to a server 80 connected to the network 700, 800. The connection to the server 80 is for example used for secure provisioning of a credential from the server 80, such as a secure delivery of the credential from the server 80 to the wireless device 60. The wireless device 60 stores a device public key and a device private key. The manufacturer BS provides for example the device public key and a device private key to the wireless device upon manufacturing. The device public key has not yet been exposed to the public and not used for any communication when provided to the wireless device 60 and/or server 80 at this stage and when used in Methods 200 (or when/before initiating initial access). The device public has not yet been used for authentication, encryption or other purposes when methods 200 are to be carried out. The server 80 stores the device public key, which is for example provided to the server by the enterprise and/or the manufacturer or retailer upon acquisition of the wireless device 60. The method 200 comprises transmitting S1 an initial access request to a network node 70 of the network 700, 800. The wireless device 60 is configured to transmit to a network node 70 a request for initial access to the network 700, 800. According to some aspects, the step of transmitting S1 comprises generating S11 a device identifier based on the device public key; and sending S12 the device identifier to the network node 70. For example, the wireless device starts by calculating the device identifier and the shared secret K and use them as temporary credentials to attach to the network 700, 800. The step of generating S11 a device identifier comprises for example calculating a hash value based on the device public (using for example SHA-256) and possibly truncating the resulting hash value to get suitable number of bits n for the device identifier such that probability for collisions in an identity register 90 is very low. The value of n could for example be n=96. The shared secret key K is computed e.g. according to Eq. 1.

According to some aspects, the step of generating S11 the device identifier comprises generating S11b a temporary device network identifier based on the device identifier.

According to some aspects, the step of generating S11b the temporary device network identifier comprises encoding the device identifier to match a network identifier format. The network identifier format comprises a cellular network identifier format and/or a wireless local area network identifier format. The cellular network identifier format is for example the IMSI format. The IMSI comprises a 15 digit number in which the 3 first digits denote the Mobile Country Code, MCC, and the next two or three digits denote the Mobile Network Code, MNC. MCC and MNC are used by the MNOs to uniquely identify the home MNO from where to request authentication data that can be used herein for initial network access authentication. For example, encoding the device identifier into the IMSI format comprises encoding all bits of the device identifier as a sequence of digits 0-9. The encoded device identifier can for example be transferred using the existing 3GPP defined identity request-response messages where 15 digits are transferred in the response message. This requires for example one or more rounds of request-response messages. The format of the device identifier given by the enterprise to the home network is for example a 3-digit manufacturer identifier concatenated with the X-digit device ID representation.

According to some aspects, the WLAN identifier format comprises a network access identifier, NAI, format. For example, the WLAN identifier format follows the NAI (user@realm) where the user part is for example a value computed as a hash of the device public key truncated to N bits) and is for example represented in hexadecimal form using 32 characters ('0'-'9', 'A', 'B', 'C', 'D', 'E', and 'F') assuming N=256. For example, in a public network access according to 3GPP, the NAI format follows the following format in a home network:
"0<IMSI>@wlan.mnc<MNC>.mcc<MCC>0.3 gppnetwork.org"
(such as 0234150999999999@wlan.mnc015.mcc234.3 gppnetwork.org
where IMSI=234150999999999, MCC=234 and MNC=15. The NAI in case of a visiting network follows the following format (decorated NAI):
"wlan.mnc<homeMNC>.mcc<homeMCC> 0.3gppnetwork.org
!0<IMSI>@wlan.mnc<visitedMNC>.mcc< visitedMCC>0.3gppnetwork.org"
According to some aspects, the NAI format is the following:
"wlan.mnc<MN>.mcc<special_MCC>0.3gppnetwork.org
!0<deviceID>@wlan.mnc<visitedMNC>.mcc<visited MCC>0.3gppnetwork.org"
where MN denotes a manufacturer identifier, special_MCC denotes a dedicated MCC value to operate according to the present disclosure, and deviceID denotes an encoded device identifier (such as 3 bits corresponds to a digit between 0-7 or hexadecimal representation as described above).

According to some aspects, the step of generating S11 the device identifier comprises receiving S11a an identity request from the network node 70. In 3GPP standard for example, when the wireless device requests initial network access for the first time and the network request the identity associated with the wireless device. According to some aspects, the step of sending S12 the device identifier comprises sending S12a the device identifier to the network node 70 in an identity response.

The method 200 comprises receiving S2 an authentication request from the network node 70. The authentication request comprises a challenge and optionally a network authenticator. The term "challenge" refers herein to data that is used to test or assess the legitimacy of the wireless device. For example, a challenge comprises a pseudo-random number or a pseudo-random string. The network authenticator permits the wireless device 60 to authenticate the network node 70 (and thus provides mutual authentication) and/or to verify the integrity of the authentication request. As only the legitimate server 80 holds the device public key, the network authenticator if generated based on a shared secret provided by the legitimate server 80 permits a verification of the server's possession of the device public key and thus also a successful authentication of the network node as legitimate (as the network node 70 and the server 80 have established a secure and mutually authenticated communication channel). The network authenticator comprises for example authentication data, such as authentication vectors generated at the second server 81 based on the shared secret K and an Authentication and Key Agreement, AKA, protocol. The shared secret key K is for example provided by the server 80 which generated the shared secret key K based on the device public key. The network authenticator therefore provides a proof of the server's possession of the device public key.

According to some aspects, when the authentication request comprises a network authenticator, the method 200 comprises verifying S3 the authentication request based on the network authenticator and the device public key. For example, the verification S3 of the authentication request is performed according to an Authentication and Key Agreement, AKA, protocol using a shared secret K derived from the device public key. For example, when the network authenticator comprises a message authentication code, MAC, over the challenge and/or a device nonce using the device public key the verification S3 of the authentication request comprises verifying S31 the MAC. A MAC herein refers to an authentication and integrity indicator computed from a message and some shared secret, such as the device public key herein or any key derived from the device public key. It is difficult to forge a MAC without knowing the shared secret. The wireless device 60 proceeds according to some aspects to step S4 upon successful verification. For example, in EAP-SIM, the step of receiving S2 comprises receiving an EAP request challenge comprising a challenge and a MAC generated by the network or the second server 81.

The method 200 comprises generating S4 a device authenticator based on the challenge and the device public key. For example, the step S4 comprises deriving S41 a shared secret from the device public key and generating the device authenticator using the UMTS AKA protocol taking the challenge and the derived shared secret as input. The device authenticator supports the network node 70 in determining whether the wireless device 60 is a legitimate wireless device (i.e. whether the wireless device 60 holds the device public key). For example, the step of generating S4 comprises generating S42 a message authentication code, MAC, using the challenge and the device public key. For example the wireless device 60 generates a MAC over the challenge using the device public key; or generates a key derived from the device public key and computes the MAC over the challenge using the derived key. The MAC is generated using a MAC generation function, such as a keyed Hash-MAC, HMAC, function, a one-time MAC function, and a block cipher. According to some aspects, the method 200 further comprises generating a session key to enable the secure provisioning of a credential from the server 80. For example, the session key comprises a cipher key and/or an integrity key.

The method 200 comprises transmitting S5 an authentication response to the network node 70. The authentication response comprises the device authenticator. For example, in EAP-TLS with pre-shared key, the step of transmitting S3 comprises transmitting to the network node 70 an EAP response message, comprising for example any of a TLS ClientKeyExchange message, a TLS ChangeCipherSpec message, and/or a TLS Finished message.

The method 200 comprises receiving S6 an initial access response from the network node 70. The initial access response comprises an indicator of whether the initial access is granted or denied by the network node 70. For example, in EAP-TLS with pre-shared key, the step of receiving S6 an initial access response comprises receiving an EAP request message, comprising for example any of a TLS ChangeCipherSpec message, and/or a TLS Finished message from the network node 70 or from an authentication server (such as server 81) via the network node 70.

The disclosed technique has the advantage of being less dependent on the underlying architecture and of accommodating various application-level protocols and possible intermediate network nodes 70 between the server 80 and the wireless device 60.

The methods disclosed herein allow flexibility in manufacturing the wireless devices as the manufacturer neither have to provision at manufacturing the wireless devices delivered to the enterprise with dedicated temporary credentials. The methods disclosed herein still enable initial network access with the already stored and unexposed device public key.

According to some aspects, the step of generating S11 the device identifier further comprises receiving S11c an additional identity request from the network, generating an additional temporary device network identifier and sending S11d an additional temporary device network identifier in an additional identity response. Additional identity request is received for example in situations where the network node needs a remaining part of the temporary device network identifier so as to match a given format.

According to some aspects, the method further comprises generating a device nonce, and transmitting the device nonce in the authentication response to the network node 70. For example, in EAP-TLS with pre-shared key, the wireless device 60 provides a random number as a nonce in an EAP response message, comprising for example a TLS ClientHello message prior to the authentication response. For example, in EAP-SIM, the wireless device 60 provides a nonce in an EAP response to the EAP request SIM/Start message. The generating S42 the message authentication code using the challenge and the device public key comprises then generating the MAC over the challenge and the device nonce using the device public key, or a key derived from the device public key. The step of generating S42 the message authentication code using the challenge and the device public key comprises deriving a shared key based on the device public key and the device nonce and generating the MAC over the challenge, or a value computed from the challenge, using the derived key.

According to some aspects, the step receiving S2 an authentication request from the network node 70 comprises receiving S21 a first authentication request comprising a challenge and a second authentication request comprising a network authenticator. The network authenticator is generated based on the device nonce, such as a MAC. For example, in EAP-TLS with pre-shared key, the step of receiving S2 comprises receiving an EAP request message comprising for example any of a TLS ServerHello message, a TLS ServerKeyExchange message, a TLS ServerHelloDone message, and possibly a TLS Certificate message from the network node 70. EAP-TLS adapted with the present technique allows the wireless device 60 and network node 70 to verify that their peer has calculated the same security parameters and that no tampering by an attacker occurred. For example, in EAP-PSK, the step of receiving a first authentication request comprises receiving EAP-PSK first message comprising the challenge and the step of receiving the second authentication request comprises the EAP-PSK third message comprising the network authenticator.

According to some aspects, the credential comprises a server public key, a server certificate, a certificate authority, CA, certificate for one or more servers 80, 81, 82 configured to communicate with the wireless device 60, a device certificate, a symmetric key, and/or an identifier. A credential comprises for example a cellular credential (such as a SIM credential, a soft SIM credential), a wireless connectivity credential (such as wireless local area network credentials), and an enterprise credential (such as for accessing the enterprise network). An identifier comprises for example an international mobile subscriber identity, IMSI, a temporary IMSI, a network access identifier, a medium access control address, and/or universal resource identifier.

Figure 3:
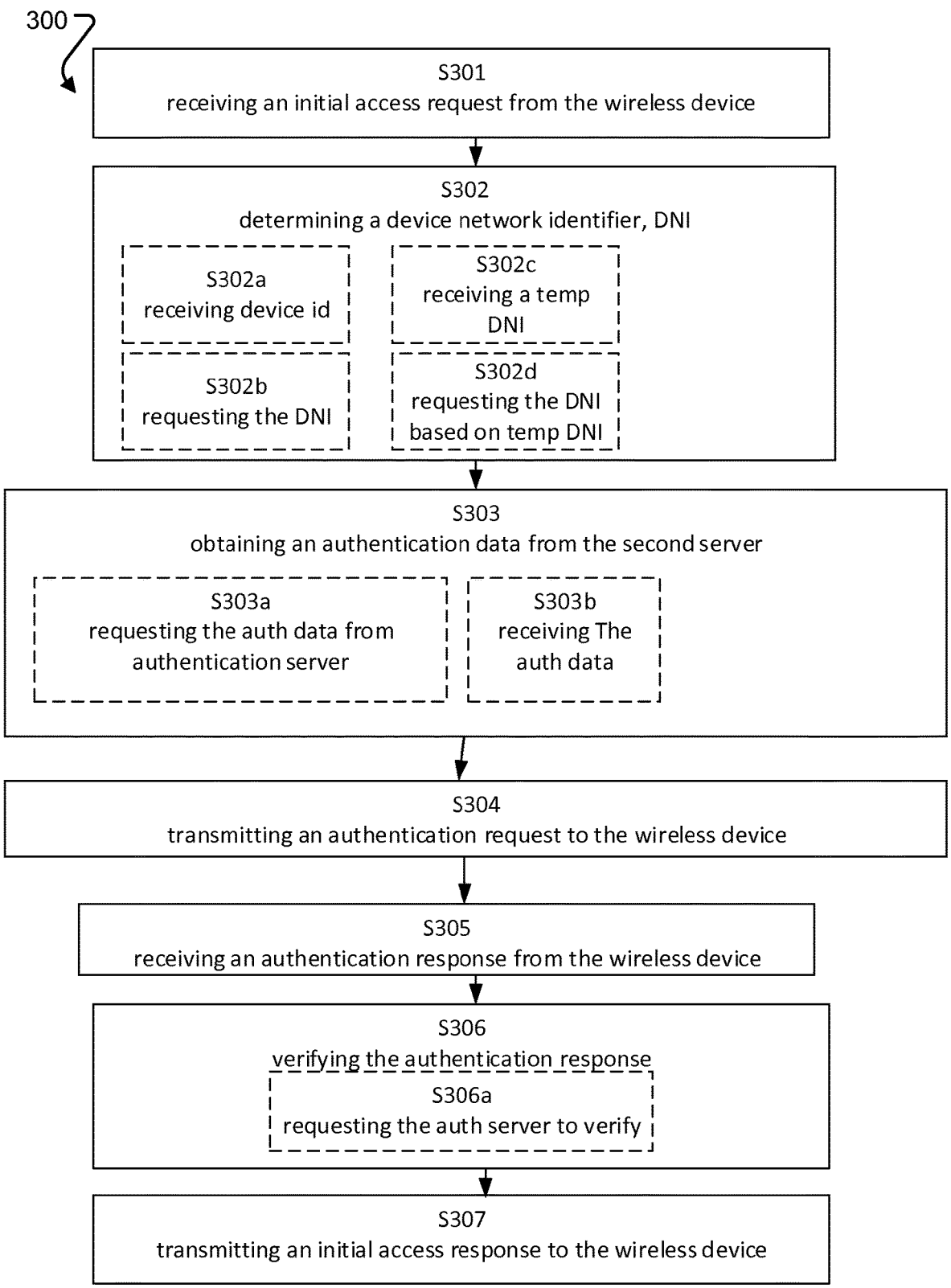
FIG. 3 is a flow chart illustrating an exemplary method, performed in a network node according to this disclosure.

FIG. 3 is a flow chart illustrating an exemplary method 300, performed in a network node 70 according to this disclosure. The method 300 is for providing initial network access to a wireless device 60. The network node 70 is connected to a first server 80 storing a device public key of the wireless device 60 and to a second server 81 as shown in FIG. 1. The manufacturer has provided, upon purchase, the enterprise or purchaser of the wireless device 60 with the device public key, and possibly device identifier. The enterprise then provides the device public key, and possibly device identifier for each purchased wireless device 60 to a server 80 of the enterprise. The method 300 is performed in the network node 70 that is for example a node in the network to which the wireless device 60 connects first in order to connect to the enterprise network (such as network 800 of FIG. 1). When starting up for the first time after purchase, the wireless device 60 has to attach to the network available in its vicinity before being bootstrapped by the enterprise server. The method 300 comprises receiving S301 an initial access request from the wireless device 60. When the wireless device 60 starts up, the wireless device 60 attempts to attach to the network 700 by sending an initial access request to the network node 70.

The method 300 comprises determining S302 a device network identifier of the wireless device 60. For example, the step of determining S302 the device network identifier comprises receiving S302a a device identifier from the wireless device 60; and requesting S302b from an identity register 90 the device network identifier using the device identifier. In some aspects, receiving S302a the device identifier from the wireless device 60 comprises transmitting an identity request to the wireless device and receiving from the wireless device an identity response comprising the device identifier.

According to some aspects, determining S302 the device network identifier comprises receiving S302c a temporary device network identifier from the wireless device 60; and requesting S302d from the identity register 90 the device network identifier using the temporary device network identifier. The temporary device network identifier is a network identifier that is encoded to have a network device identifier format (such as a cellular network identifier format and/or a wireless local area network identifier format) but is not a permanent "real" network device identifier. The cellular network identifier format is for example the IMSI format. The WLAN identifier format comprises a network access identifier, NAI, format. The temporary device network identifier is derived by the wireless device 60 and/or by the first server 80 based on the device public key and is stored in the identity register 90 at an initialization phase. This way, the network node 70 is able to obtain the device network identifier from the identity register 90, independently on whether the network node 70 is located in a home network, or a visited network.

The method 300 comprises obtaining S303 from the second server 81, an authentication data corresponding to the device network identifier, the authentication data comprising a challenge, and optionally a network authenticator. For example, obtaining S303 from the second server 81 an authentication data corresponding to the device network identifier comprises determining based on the device network identifier which second server 81 to contact for authentication data, such as which home network/operator to contact, such as determining the network address of the second server 81 (e.g. an authentication server from which authentication data is obtained). For example, the step of obtaining S303 comprises requesting S303a the authentication data corresponding the device network identifier from the authentication server (such as server 81) and receiving S303b the authentication data from the authentication server. According to some aspects, the authentication data is generated by the second server 81, and the network authenticator of the authentication data is generated by the second server 81 based on a key derived by the first server 80 using the device public key. For example, in cellular networks, the authentication data is generated by the HLR/HSS based on keying material provided by the enterprise server (e.g. server 80) that has derived the keying material based on the device public key.

The method 300 comprises transmitting S304 an authentication request to the wireless device 60. The authentication request comprises the challenge, and optionally a network authenticator. The network authenticator provides a proof of the first server's possession of the device public key. The network authenticator permits the wireless device 60 to authenticate the network node 70 and/or to verify the integrity of the authentication request. As only the legitimate server 80 holds the device public key, the network authenticator if generated based on a shared secret provided by the legitimate server 80 permits a verification of the server's possession of the device public key and thus also a successful authentication of the network node as legitimate (as the network node 70 and the server 80 have established a secure and mutually authenticated communication channel).

The method 300 comprises receiving S305 an authentication response from the wireless device 60. The authentication response comprises a device authenticator.

The method 300 comprises verifying S306 the received authentication response based on the device authenticator and the authentication data (such as using authentication data generated using a key derived from the device public key or an expected device authenticator generated using a key derived from the device public key (e.g. XRES in UMTS AKA)). The authentication data enables the network node 70 to authenticate the wireless device 60 as legitimate wireless device without the network node 70 having to store the device public key. Authentication data securely obtained by the network node 70 from the second server 81 has been computed by the second server 81 based on e.g. a key derived from the device public key. The key derived from the device public is for example obtained securely by the second server 81 from the first server 80. As only the first server 80 holds the device public key, and as the second server 81 and the first server 80 have an authenticated and secure connection and the second server 81 and the network node 70 also have an authenticated and secure connection, the wireless device 60 can thereby be authenticated based on the authentication data and the device authenticator. And upon successful verification, the method 300 comprises transmitting S307 an initial access response to the wireless device 60. The initial access response comprises an indicator that the initial access is granted. According to some aspects, verifying S306 the received authentication response comprises requesting S306a the authentication server (such as server 81) to verify the received authentication response.

Figure 4:
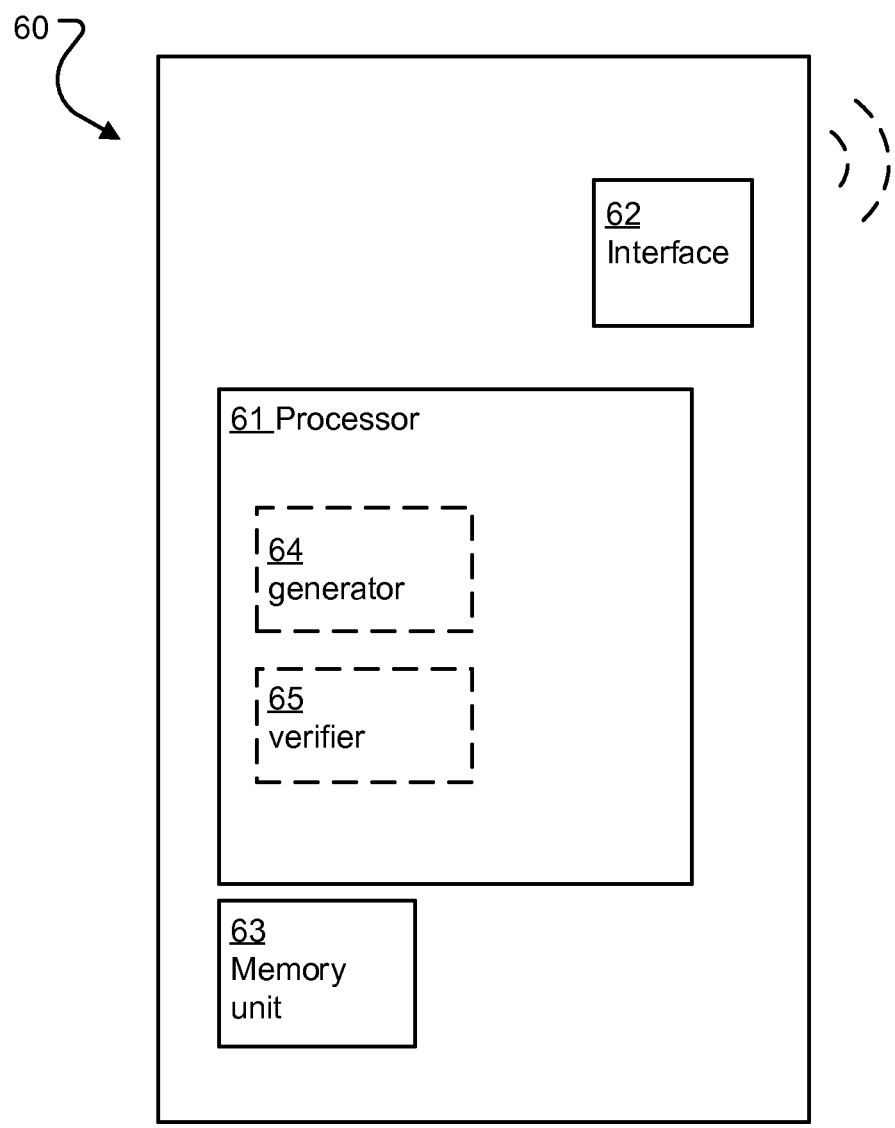
FIG. 4 is a block diagram illustrating an exemplary wireless device according to this disclosure.

FIG. 4 is a block diagram illustrating an exemplary wireless device 60 according to this disclosure. The wireless device 60 is configured to obtain initial access to a network 700, 800 in order to establish a connection to a server 80 connected to the network 700, 800. The purpose of the network access is e.g. for bootstrapping credentials. The wireless device 60 comprises an interface 62 configured to communicate with a server 80 and a network node 70, such as with the server 80 via the network node 70. The interface 62 comprises for example a wireless communication interface (such as for short-range communication, wireless local area network communication, cellular communication) and/or a wired communication interface.

The wireless device 60 comprises a memory unit 63 having a device public key and a device private key stored thereon. The memory unit 63 is for example a data storage such as collocated data storage, a remote data storage, removable and non-removable storage including, but not limited to, Read Only Memory, ROM, Random Access Memory, RAM. The manufacturer BS provides for example the device public key and a device private key to the wireless device at manufacturing. The server 80 stores the device public key, which is for example provided to the user/enterprise by the manufacturer or retailer upon acquisition of the wireless device 60 and the user/enterprise stores them on the server 80. The device public key is unexposed at this point and mutual/device authentication can thus be achieved using the device public key as a shared secret.

The wireless device 60 comprises a processor 61 configured to transmit an initial access request to the network node 70 of a network 700, 800 via the interface 62. The processor 61 refers herein to a processing unit, such as a central processing unit, a distributed processing unit. According to some aspects, the processor 61 is configured to generate a device identifier by generating a temporary device network identifier based on the device identifier. The processor 61 is further configured to transmit the temporary device network identifier to the network node 70 in the initial access request or in an identity response to an identity request. Hence, according to some aspects, the processor 61 comprises a generator 64 configured to generate a device identifier. The processor 61 for example first generates the device identifier based on the device public key, and then encodes the device identifier to match a temporary device network identifier. For example, the processor 61 is configured to generate the temporary device network identifier by encoding the device identifier to match a network identifier format, wherein the network identifier format comprises a cellular network identifier format and/or a wireless local area network identifier format. The network identifier format comprises a cellular network identifier format and/or a wireless local area network identifier format. The cellular network identifier format is for example the IMSI format. According to some aspect, the WLAN identifier format comprises a network access identifier, NAI, format.

As stated above, the wireless device 60 comprises a processor 61 configured to receive an authentication request from the network node 70 via the interface 62. The authentication request comprises a challenge. This provides the network node with a means for authenticating the wireless device 60. The authentication request optionally further comprises a network authenticator and the processor 61 configured to verify the authentication request based on the network authenticator. The network authenticator provides a proof of the server's possession of the device public key. For example, in EAP-TLS with pre-shared key, the processor 61 is configured to receive, via the interface 62, an EAP request message comprising any of a TLS ServerHello message, a TLS ServerKeyExchange message, a TLS ServerHelloDone message, and possibly a TLS Certificate message from the network node 70. The processor 61 is configured, according to some aspects, to verify the network authenticator according to an Authentication and Key Agreement, AKA, protocol using a shared secret derived from the device public key. The processor 61 is upon successful verification configured to proceed to generate the device authenticator.

Thus, the processor 61 is configured to generate a device authenticator. Hence, according to some aspects, the generator 64 is configured to generate the device authenticator. According to some aspects, the device authenticator comprises a message authentication code computed based on the device public key. For example, the processor 61 or generator 64 generates a message authentication code, MAC, using the challenge and the device public key or generates a key derived from the device public key and computes the MAC over the challenge using the derived key. For AKA-employing access networks, the processor 61 or generator 64 derives a shared secret from the device public key and generates the device authenticator using the AKA protocol taking the challenge and the derived shared secret as input.

The processor 61 is configured to transmit, via the interface 62, an authentication response to the network node 70. The authentication response comprises the device authenticator. For example, in EAP-TLS with pre-shared key, the processor 61 is configured to transmit the authentication response to the network node 70 as an EAP response message comprising any of a TLS ClientKeyExchange message, a TLS ChangeCipherSpec message, and/or a TLS Finished message.

The processor 61 is configured to receive, via the interface 62, an initial access response from the network node 70, the initial access response comprising an indicator of whether initial access is granted or denied. For example, in EAP-TLS with pre-shared key, the initial access response corresponds to an EAP request message comprising e.g. any of a TLS ChangeCipherSpec message, and/or a TLS Finished message from the network node 70.

The disclosed wireless device benefits from an optimized storage as the device public key is used as a shared secret for obtaining initial network access and thus no dedicated additional material is needed for this purpose. The disclosed wireless device has also the advantage of being less dependent on the underlying architecture and of being adaptable to various application-level protocols and possible intermediate network nodes 70 and gateways between the server 80 and the wireless device 60.

Figure 5:
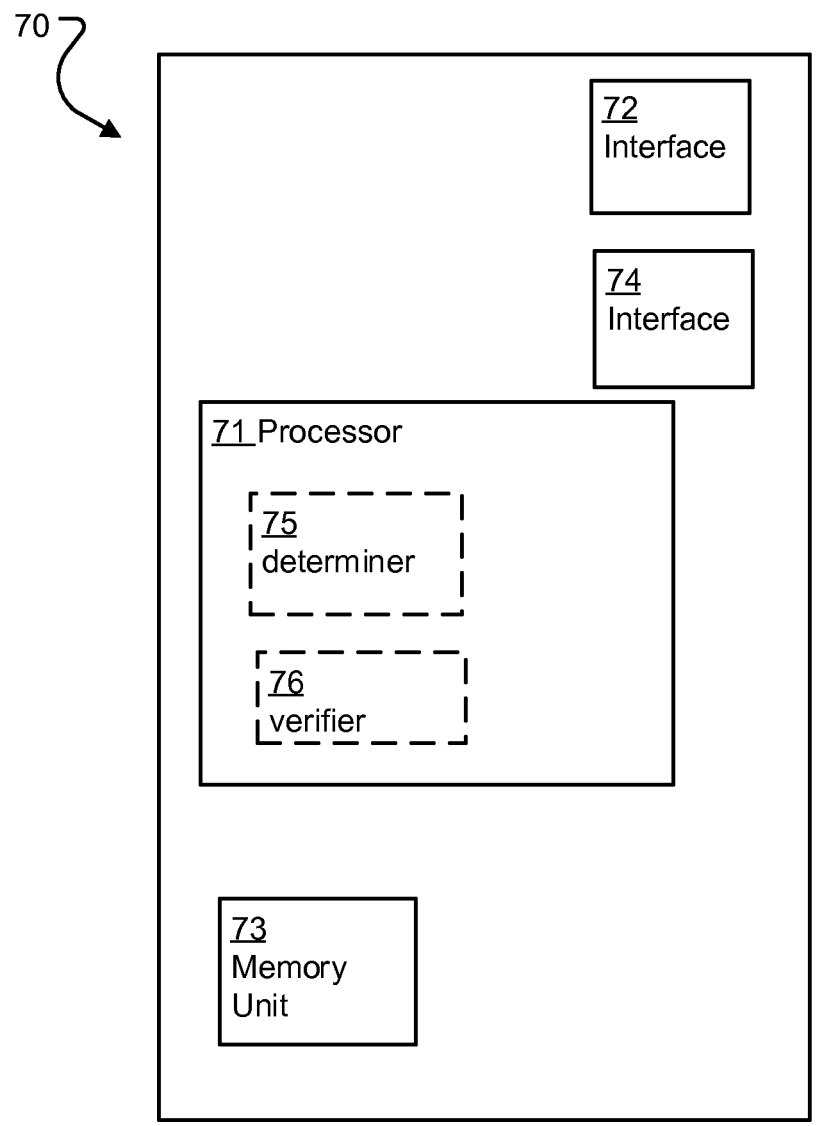
FIG. 5 is a block diagram illustrating an exemplary network node according to this disclosure.

FIG. 5 is a block diagram illustrating an exemplary network node 70 according to this disclosure. The network node 70 is configured to provide initial network access to a wireless device 60. The network node 70 comprises a first interface 72 configured to communicate with the wireless device 60. The interface 72 comprises for example an interface operatively connected to a wireless communication interfacing device (such as for short-range communication, wireless local area network communication, cellular communication) and/or a wired communication interface. The network node 70 comprises a second interface 74 configured to communicate with a first server 80 storing a device public key of the wireless device 60 and a second server 81. The manufacturer or retailer provides for example the device public key, and possibly device identifier to the enterprise upon purchase of the wireless device. The first server 80 is then loaded with the device public key and possibly also with the device identifier. The first server 80 stores the device public key in a memory unit. The server 80 has also stored, in a memory unit, the server public key and the server private key.

The network node 70 comprises a memory unit 73. The memory unit 73 is for example a data storage such as a collocated data storage, a remote data storage, removable and non-removable storage including, but not limited to, Read Only Memory, ROM, Random Access Memory, RAM.

The network node 70 comprises a processor 71 configured to receive, via the interface 72, an initial access request from the wireless device 60. When the wireless device 60 starts up, the wireless device 60 attempts to attach to the network 700 and the network node 70 receives then an initial access request.

The processor 71 is configured to determine a device network identifier of the wireless device 60. Hence, the processor 71 comprises e.g. a determiner 75 configured to determine a device network identifier. For example, the processor 71 is configured to determine the device network identifier by receiving a device identifier from the wireless device 60; and requesting from an identity register 90 the device network identifier using the device identifier. The device identifier may be a temporary device network identifier and the processor 71 is then configured to identify the permanent device network identifier using the identity register.

The processor 71 is configured to obtain, from the second server 81, via the interface 74, authentication data corresponding to the device network identifier. The authentication data comprises a challenge, and optionally a network authenticator. The network authenticator provides a proof of the first server's possession of the device public key. According to some aspects, the processor 71 is configured to obtain the authentication data corresponding to the device network identifier by requesting the authentication data corresponding the device network identifier from an authentication server (such as server 80) and receiving the authentication data from the authentication server (such as server 80).

The processor 71 is configured to transmit, via the interface 72, an authentication request to the wireless device 60. The authentication request comprises the challenge and optionally a network authenticator. For example, in EAP-TLS with pre-shared key, the processor 71 is configured to transmit as authentication request an EAP request message comprising for example any of a TLS ServerHello message, a TLS ServerKeyExchange message, a TLS ServerHelloDone message, and possibly a TLS Certificate message.

The processor 71 is configured to receive, via the interface 72, an authentication response from the wireless device 60. The authentication response comprises a device authenticator. The device authenticator supports the network node 70 in determining whether the wireless device 60 is a legitimate wireless device (i.e. whether the wireless device 60 holds the device public key). According to some aspects, the device authenticator comprises a message authentication code, MAC, computed based on the device public key.

The processor 71 is configured to verify the received authentication response based on the device authenticator and the authentication data (such as using authentication data generated using a key derived from the device public key or an expected device authenticator generated using a key derived from the device public key, depending on the authentication protocol carried out by the network node). Hence, according to some aspects, the processor 71 comprises a verifier 76 configured to verify the received authentication response.

The processor 71 is configured to, upon successful verification, transmit, via the interface 72, an initial access response to the wireless device 60. The initial access response comprises an indicator that the initial access is granted. For example, in EAP-TLS with pre-shared key, the processor 71 is configured to transmit an EAP request message comprising for example any of a TLS ChangeCipherSpec message, and/or a TLS Finished message to the wireless device 60.

Figure 6:
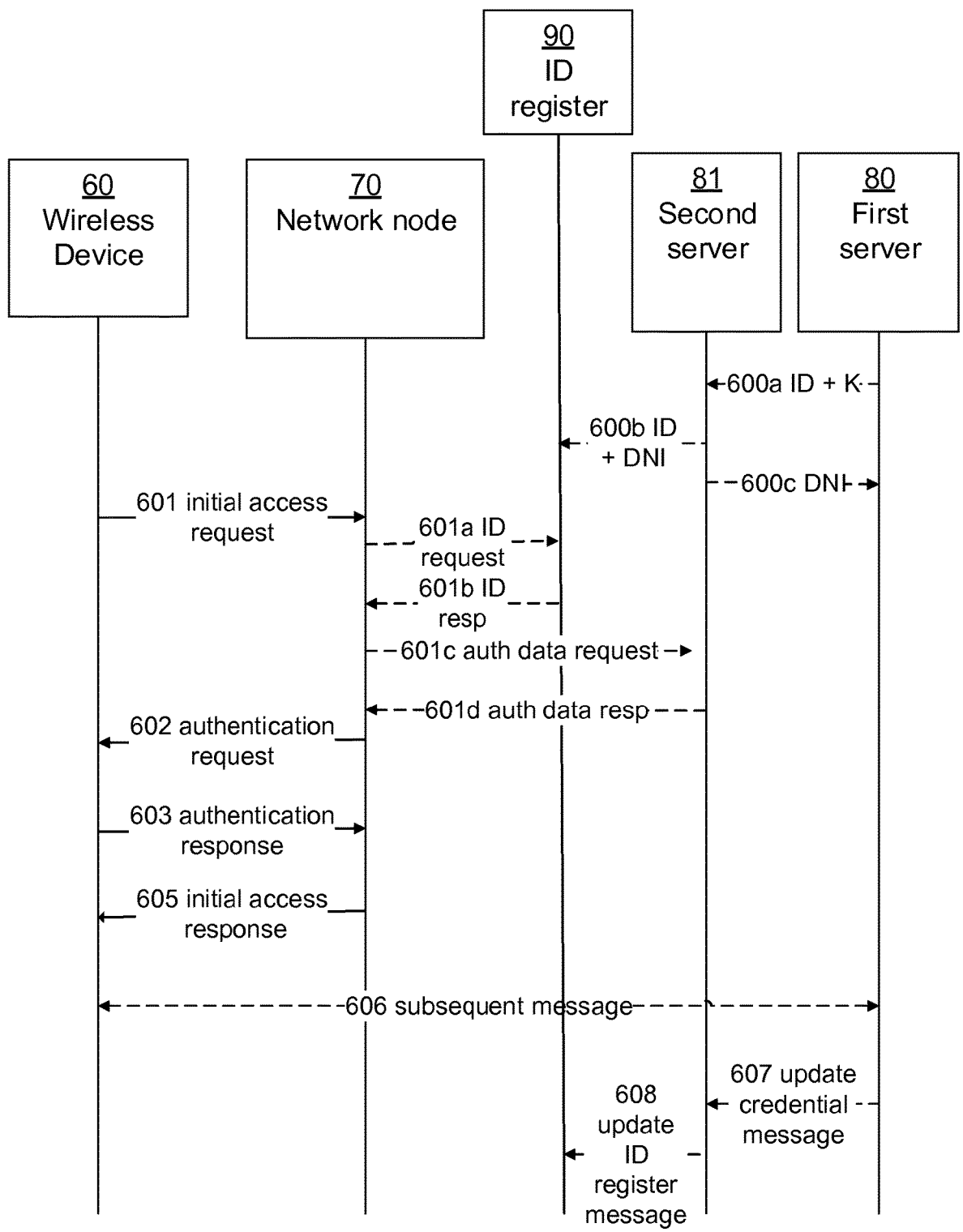
FIG. 6 is a signaling diagram illustrating an exemplary exchange of messages for initial network access of the wireless device according to this disclosure.

FIG. 6 is a signaling diagram illustrating an exemplary exchange of messages for initial access of a wireless device 60 to a network node 70 connected to a first server 80 and a second server 81 according to this disclosure. The first server 80 is in this example a device management server, such as a bootstrapping server. The first server 80 belongs for example to an enterprise network, the enterprise have purchased the wireless device 60. The enablement of the initial access starts optionally with an initialization phase where the first server 80, the second server 81 and the identity register 90 are provisioned with the proper material to carry out the present technique (such as for the first server 80 provisioned with the device public key, and the second server 81 provisioned with authentication data generated by e.g. the first server 80 using the device public key, the identity register provisioned with the device identifier and the device network identifier). For each wireless device, the enterprise or the first server 80 derives a shared secret K from the device public key according to e.g. Eq. (1). The first server 80 also computes a device identifier based on the device public key. The device identifier and keying material comprising the shared secret K and/or keys derived from the shared secret are transmitted to the second server 81 in a message 600a, which is for example an HLR of a home network. The second server 81 assigns the keying material with a device network identifier (such as an IMSI) and registers/stores the device network identifier and the keying material along with other suitable parameters. The second server 81 registers the device identifier with the device network identifier assigned for each wireless device in an identity register 90 by transmitting message 600b to the identity register 90. The second server 81 generates credentials comprising the device network identifier for each wireless device (such as soft SIM credential including IMSI) and delivers them in a message 600c to the enterprise that configures this information into the first server 80.

The wireless device 60 sends an initial access request 601 to the network node 70 for obtaining initial access to the network at hand (such as in Step S1 of FIG. 2). The device identifier may be included in the initial access request 601 so that the server is able to identify the device using the identity register 90. The network node 70 sends for example an identity request 601a to the identity register 90 (such as in Step S302b/c of FIG. 3), the identity request 601 comprising a device identifier and/or a temporary device network identifier, DNI (such as a temporary IMSI, or a device identifier encoded to match an IMSI format). If the identity register finds the corresponding "real" DNI (such as real IMSI), the identity register 90 returns to the network node 70 an ID response 601b comprising the "real"/permanent DNI (to achieve for example step S302 of FIG. 3). The network node 70 can then send an authentication data request 601c to the second server 81 (such as in Step S303a of FIG. 3) and obtains (such as in Step S303 of FIG. 3) authentication data corresponding to the permanent DNI in an authentication data response 601d (such as in Step S303b of FIG. 2). The network node 70 sends an authentication request 602 to wireless device 60 (such as in Step S304 of FIG. 3). The authentication request 602 comprises a challenge possibly generated by the second server 81 and provided in the authentication data response 601d. Optionally, the authentication request 602 comprises a network authenticator generated by the second server 81 and provided in the authentication data response 601d to enable mutual authentication (which the wireless device 60 verifies in e.g. Step S3 of FIG. 2). The wireless device 60 receives the authentication request 602 (such as in Step S2 of FIG. 2) and prepares an authentication response 603 by calculating a response or device authenticator based on the challenge and a shared key derived from the device public key (such as in Step S4, S41, and/or S42 of FIG. 2). The wireless device 60 sends the authentication response 603 to the network node 70 (such as in Step S5 of FIG. 2). The network node 70 receives the authentication response 603 (such as in Step S305 of FIG. 3) and validates the received authentication response (such as in Step S306 of FIG. 3). If the authentication response 603 is wrong or corrupted, the network node 70 sends (such as in Step S307 of FIG. 3) an initial access response 605 to the wireless device 60 indicating that access is denied. If the authentication response 603 is correct or valid, the network node 70 sends (such as in Step S307 of FIG. 3) an initial access response 605 to the wireless device 60 indicating that access is granted and grants access to the wireless device 60. The wireless device 60 receiving (such as in Step S6 of FIG. 2) the initial access response 605 indicating granted access may then communicate by sending subsequent messages 606 securely to the first server 80 for e.g. bootstrapping. In the bootstrapping phase, permanent network access credentials may be provisioned to the wireless device 60 and in this case the first server 80 sends an update credential message 607 indicating to the second server 81 to update its database to use the permanent network access credentials in subsequent network access attempts. Optionally for maintaining and optimizing the identity register operations, the second server 81 informs by an updated ID register message 608 the identity register 90 that the temporary DNI of the wireless device may be removed from the register.

Figure 7:
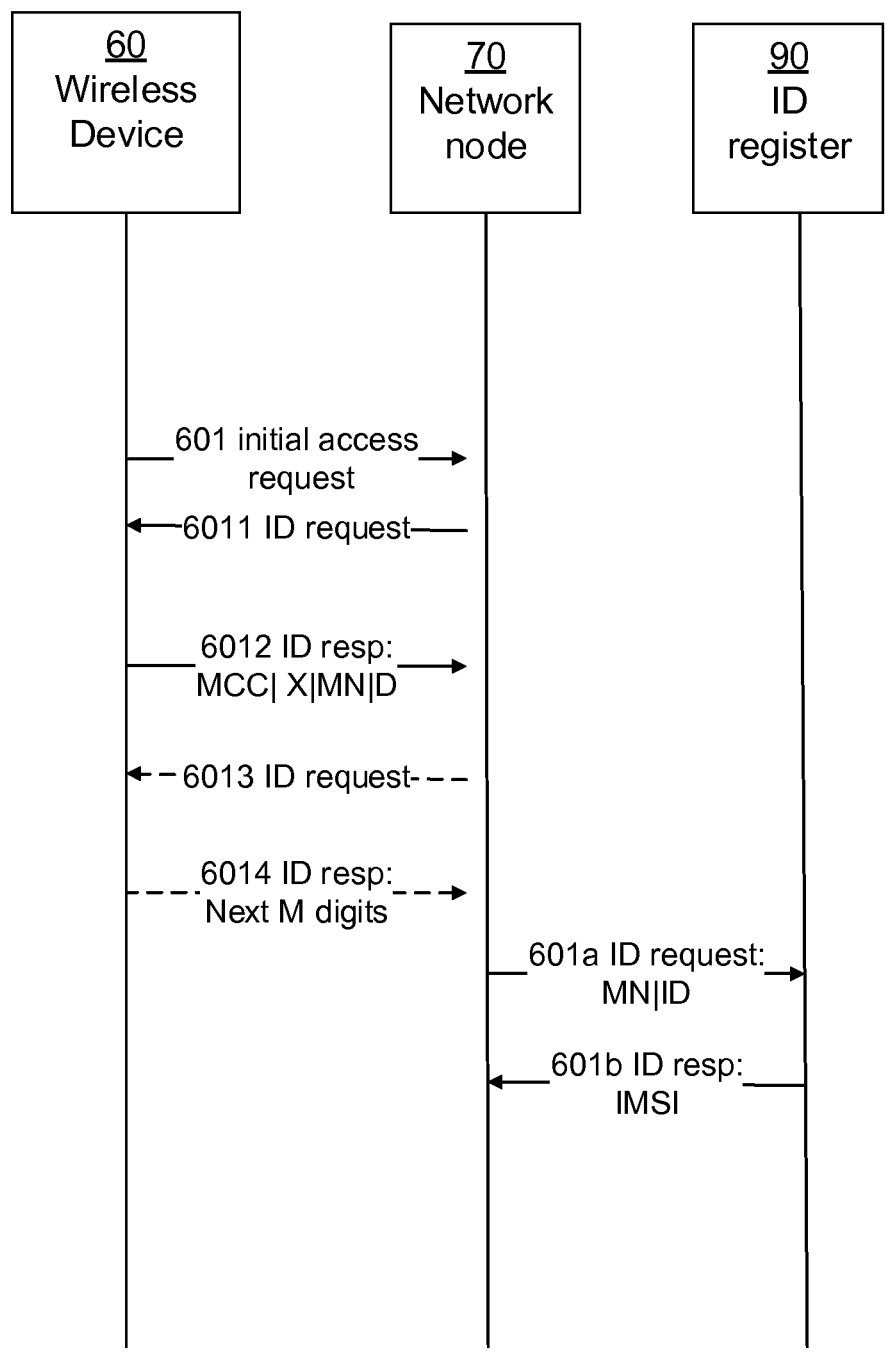
FIG. 7 is a signaling diagram illustrating an exemplary exchange for device identification according to this disclosure.

FIG. 7 is a signaling diagram illustrating an exemplary message exchange for device identification according to this disclosure. The wireless device 60 requests network access to the network node 70 by sending an initial access request 601 (such as in Step S1 of FIG. 2). The network node 70 sends an identity request 6011 to the wireless device 60 (such as in Step S302b/c of FIG. 3). The wireless device 60 calculates (such as in Step S11 of FIG. 2) the number of digits X used in the encoding of the n-bit device identifier. An exemplary method is to encode 3 bits as one digit. There exists more efficient encodings that could also be used. As an example using simple encoding the 15-bit device identifier 010101110011001 is encoded as 25631. As a response to the identity request, the wireless device 60 responds (such as in Step S12 of FIG. 2) with an identity response 6012 comprising MCC|X|MN|D, where MCC is the first three digits of identity response represented by the dedicated MCC value mentioned above, MN is a 3-digit manufacturer identifier, X is a 2-digit field indicating the number of digits of the device ID, and D is the first 7 digits of the device identifier. The MCC and the MN are configured into the wireless device at manufacturing.

The network node 70 receives the identity response 6012 and concludes from the MCC value that this is a special identifier that is being transferred. The network node 70 calculates the remaining number of digits to be transferred. If the remaining number of digits is greater than zero then the network node sends an additional identity request 6013 to the wireless device 60 or sends error message indicating no roaming for this MCC/MNC in case the MCC was not recognized. Only networks or operators engaged in providing support for initial network access for these wireless devices can recognize the new special MCC value. Other networks or operators simply reject network access. If the remaining number of digits is equal to zero, then based on the value of MCC and MN the network node 70 decides what identity register to contact to obtain the real IMSI value allocated for the wireless device 60 (for example as part of step S302 of FIG. 3). The network node 70 sends an identity request 601a to the identity register 90 (such as in Step S302b/c of FIG. 3). There can be several identity registers or a common one used by several home/enterprise networks. A temporary device network identifier such as the 3-digit manufacturer identifier concatenated with the X-digit device identifier is used as input to the search for the real IMSI at the identity register. If the real IMSI is found, the identity register returns the real IMSI to the network node 70 in an identity response 601b.

In case of an additional identity request was sent, the wireless device 60 sends (such as in Step S11d of FIG. 2) an identity response 6014 comprising an IMSI consisting of the next M (e.g. 15) digits of the device identifier. If the remaining digits to be transferred x are fewer than M, the last M-x digits are set to 0. In case of an error message the wireless device searches for a new network and tries to obtain access. The network node calculates the remaining number of digits to be transferred. If the remaining number of digits is greater than zero, then additional identity requests need to be sent.

The wireless device 60 and the network node 70 can then proceed to exchanging authentication requests and responses and the wireless device 60 may then obtain initial network access grant (such with messages 602, 603, 605 shown in FIG. 6).

The disclosed technique does not require changes to the format of the messages sent between wireless device and the network but may require a number of request/response rounds to support initial network access for the wireless devices disclosed herein.

Figure 8:
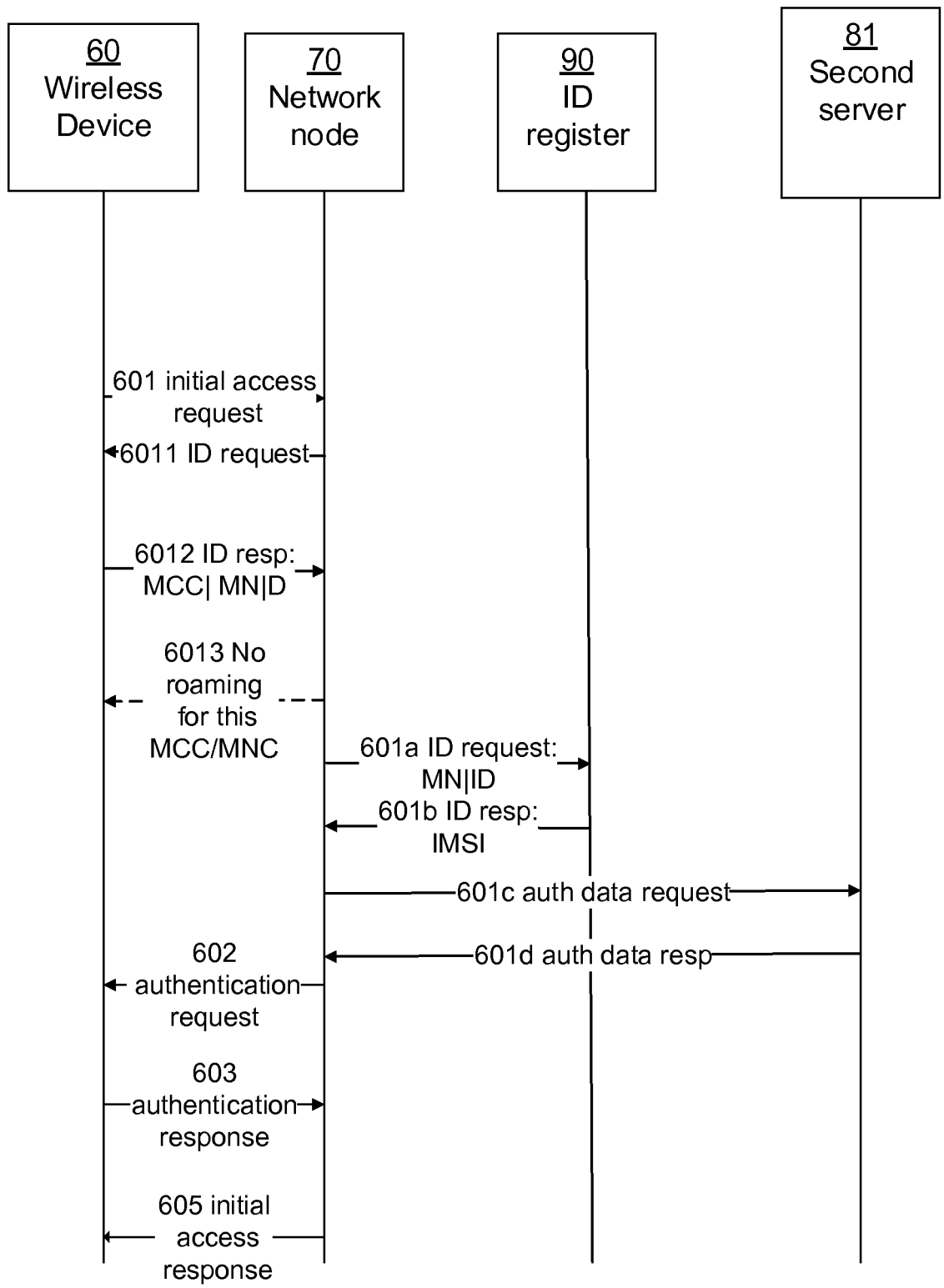
FIG. 8 is a signaling diagram illustrating another exemplary exchange for device identification according to this disclosure.

FIG. 8 is a signaling diagram illustrating another exemplary message exchange for device identification according to this disclosure. In this example, the device identifier representation is truncated to as few bits as can fit into one IMSI to minimize the necessary changes in the visited network. This increases the probability of collisions and therefore a scheme is proposed herein to deal with these collisions. This scheme is based on that if there is already an entry inserted into the identity register with a given device identifier value a new entry receives the next free space in the list.

The enterprise provides the device identifier in the following 12-digit format to the home network: MN|D, where MN is a 2-digit manufacturer identifier and D is 10 digits representing the device identifier. An exemplary method to encode device identifier is to take the first 33 bits of the device identifier and convert this to a 10-digit decimal number.

The home network inserts the device identifier into the identity register 90. If there is already an entry the home network calculates D'=(D+1) (mod 10^10) and checks if there is an entry MN|D'. If there is not, i.e. the entry is available, then this entry is chosen. If there is, then this procedure (increase by one and check if entry is available) is repeated until an available entry is found. The home network can also store the original value MN|D as part of the same entry in the identity register which can be used in an optimization as described below.

The wireless device 60 prepares the 10-digit representation D of the device identifier as described above. The wireless device 60 requests network access to the network node 70 by sending an initial access request 601 (such as in Step S1 of FIG. 2). The network node sends an identity request 6011 to the wireless device 60 (as part of e.g. Step S302 of FIG. 3). The wireless device 60 responds (such as in Step S302*b/c* of FIG. 3) with an identity response 6012 comprising MCC|MN|D, where MCC is the first three digits of identity response represented by the dedicated MCC value mentioned above and MN is a 2-digit manufacturer identifier. The MCC and the MN are configured into the wireless device at manufacturing.

The network node 70 concludes from MCC that a special identity is used. If the special MCC is not recognized or supported by the visited network, a "No roaming" message 6013 is returned to the wireless device 60 indicating that roaming is not supported for this MCC/MNC. The wireless device 60 has to then search for another network and restarts access request. If special MCC is supported by the visited network, the network node 70 decides what identity register 90 to use to obtain the real IMSI value allocated for the wireless device based on the value of MCC and MN.

The network node 70 sends an identity request 601*a* to the identity register 90 for the real IMSI (such as part of Step S302 of FIG. 3). The identity request 601*a* comprises the 12-digit MN|D value which is used by the identity register 90 as input to the search for the real IMSI. If there is a valid entry then the corresponding real IMSI value is returned in an identity response 601*b* to the network node 70, otherwise an error is returned.

The network nodes 70 contacts the second server 81 of the home network to get the authentication vectors using the real IMSI as device network identifier, by sending (such as in Step S303*a* of FIG. 3) an authentication data request 601*c* to the second server 81. The second server 81 responds to the network node 70 with an authentication data response comprising the authentication vectors if the IMSI is legitimate. The wireless device 60 and the network node 70 run then the AKA procedure by exchanging an authentication request 602 and an authentication response 603 (such as to carry out Steps S304-S306 of FIG. 3/Steps S2-S5 of FIG. 2 with S3 as optional). If the AKA is successful, the network node 70 grants access and sends an initial access response 605 to the wireless device 60 such as in Step S307 of FIG. 3.

If an error occurs, this indicates to the wireless device 60 that there was already an entry MD|D in the identity register 90 when the home network inserted this particular entry. Hence, the device calculates D=(D+1) (mod 10^10) and then initiates network access again. This procedure is repeated until the AKA is successful and the device gets network access, or until a maximum number of tries is reached. In the latter case the device searches for a new network and restarts initial access with the new network.

It may be envisaged to optimize the flow between wireless device 60, network node 70, and identity register 90 by, in the case that an entry for MD|D is not there, the wireless device 60 is configured to e.g. search the nearest entries above and look for MD|D in the field where the original MD|D value is stored and, in case such an entry is found, to return the IMSI from that entry. If this is the case it is likely that an entry MD|D existed when this entry was inserted, but that it has later been removed due to successful provisioning of credentials for the wireless device corresponding to MD|D.

The efficiency of the disclosed exchange depends on how crowded or populated the identity register is. If the identity register is very crowded then several loops in the flow above may be necessary before the correct real IMSI is obtained. However, compared to the example given in FIG. 7, this example requires less change to an existing visited network. The only update needed in the network is to recognize the special MCC value and in case the special MCC value is received, to contact a suitable identity register to request the real device network identifier using the remaining 12 digits of the received identity response.

It should be appreciated that FIGS. 1-8 comprises some modules or operations which are illustrated with a darker border and some modules or operations which are illustrated with a dashed border. The modules or operations which are comprised in a darker border are modules or operations which are comprised in the broadest example embodiment. The modules or operations which are comprised in a dashed border are example embodiments which may be comprised in, or a part of, or are further modules or further operations which may be taken in addition to the modules or operations of the darker border example embodiments. It should be appreciated that operations need not be performed in order. Furthermore, it should be appreciated that not all of the operations need to be performed. The example operations may be performed in any order and in any combination.

It should be appreciated that the example operations of FIGS. 2 and 3 may be performed simultaneously for any number of components and apparatuses.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "components", "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments.

Accordingly, although specific terms are employed, they are used in a generic and descriptive sense only and not for purposes of limitation, the scope of the embodiments being defined by the following claims.

The invention claimed is:

1. A method, performed in a wireless device, for obtaining initial access to a network in order to establish a connection to a server connected to the network, the wireless device storing a device public key and a device private key, the server storing the device public key, the method comprising:
transmitting an initial access request to a network node of the network;
receiving an authentication request from the network node, the authentication request com prising a challenge;
generating a device authenticator based on the challenge and the device public key, wherein generating the device authenticator comprises generating a message authentication code (MAC) over the challenge and a device nonce using the device public key;
transmitting an authentication response to the network node, the authentication response comprising the device authenticator; and
receiving an initial access response from the network node, the initial access response comprising an indicator of whether the initial access has been granted or denied.

2. The method according to claim 1, wherein transmitting comprises generating a device identifier based on the device public key; and sending the device identifier to the network node.

3. The method according to claim 1, wherein the authentication request further comprises a network authenticator, and wherein the network authenticator provides a proof of the server's possession of the device public key, the method further comprising verifying the authentication request based on the network authenticator and the device public key; and proceeding to the step of generating upon successful verification.

4. The method according to claim 1, wherein generating the device authenticator comprises deriving a shared secret from the device public key and generating the device authenticator using the AKA protocol taking the challenge and the derived shared secret as input.

5. The method according to claim 1, the method comprising generating a session key to enable the secure provisioning of a credential from the server.

6. The method according to claim 1, the method further comprising generating the device nonce, and transmitting the device nonce in the authentication response to the network node.

7. The method according claim 1, the credential comprises a server public key, a server certificate, a certificate authority, CA, certificate for one or more servers configured to communicate with the device, a device certificate, a symmetric key and/or an identifier.

8. The method according to claim 1, wherein the network is a home network, an enterprise network and/or a visited network.

9. The method according to claim 2, wherein generating the device identifier comprises receiving an identity request from the network node, and wherein sending the device identifier comprises sending the device identifier to the network node in an identity response.

10. The method according to claim 2, wherein generating the device identifier comprises generating a temporary device network identifier based on the device identifier.

11. The method according to claim 2, wherein generating the device identifier further comprises receiving an additional identity request from the network, generating an additional temporary device network identifier and sending an additional temporary device network identifier in an additional identity response.

12. The method according to claim 3, wherein the verification of the authentication request is performed according to an Authentication and Key Agreement, AKA, protocol using a shared secret derived from the device public key.

13. The method according to claim 5, wherein the session key comprises a cipher key and/or an integrity key.

14. The method according to claim 10, wherein generating the temporary device network identifier comprises encoding the device identifier to match a network identifier format, wherein the network identifier format comprises a cellular network identifier format and/or a wireless local area network identifier format.

15. The method according to claim 14, wherein the cellular network identifier format comprises an International Mobile Subscriber Identity, IMSI, format.

16. The method according to claim 14, wherein the wireless local area network identifier comprises a network access identifier.

17. The method according to claim 6, wherein receiving an authentication request from the network node comprises receiving a first authentication request comprising a challenge and a second authentication request comprising a network authenticator, wherein the network authenticator is generated based on the device nonce.

18. The method according to claim 6, wherein the network authenticator comprises a MAC over the challenge and/or the device nonce using the device public key and wherein verifying the authentication request comprises verifying the MAC.

19. A method, performed in a network node, for providing initial network access to a wireless device, the network node being connected to a first server storing a device public key of the wireless device and to a second server, the method comprising:
receiving an initial access request from the wireless device;
determining a device network identifier of the wireless device;
obtaining, from the second server, authentication data corresponding to the device network identifier, the authentication data comprising a challenge;
transmitting an authentication request to the wireless device, the authentication request comprising the challenge;
receiving an authentication response from the wireless device, the authentication response comprising a device authenticator that includes a message authentication code (MAC) generated over the challenge and a device nonce using the device public key;
verifying the received authentication response based on the device authenticator and the authentication data; and upon successful verification:
transmitting an initial access response to the wireless device.

20. The method according to claim 19, wherein determining the device network identifier comprises receiving a device identifier from the wireless device; and requesting from an identity register the device network identifier using the device identifier.

21. The method according to claim 19, wherein determining the device network identifier comprises receiving a temporary device network identifier from the wireless device; and requesting from the identity register the device network identifier using the temporary device network identifier.

22. The method according to claim 19, wherein the authentication data comprises a network authenticator, wherein the network authenticator provides a proof of the first server's possession of the device public key; and wherein the authentication request further comprises the network authenticator.

23. The method according to claim 19, wherein obtaining from the second server an authentication data corresponding to the device network identifier comprises requesting the authentication data corresponding the device network identifier from an authentication server and receiving the authentication data from the authentication server.

24. The method according to claim 19, wherein the authentication data is generated by the second server, and wherein the network authenticator of the authentication data is generated by the second server based on a key derived by the first server using the device public key.

25. The method according to claim 20, wherein receiving the device identifier from the wireless device comprises transmitting an identity request to the wireless device and receiving an identity response comprising the device identifier.

26. The method according to claim 23, wherein verifying the received authentication response comprises requesting the authentication server to verify the received authentication response.

27. A wireless device, the wireless device comprising:
an interface configured to communicate with a server and a network node;
a memory unit having a device public key and a device private key stored thereon;
a processor configured to:
transmit an initial access request to the network node of a network via the interface;
receive, via the interface, an authentication request from the network node, the authentication request comprising a challenge;
generate a device authenticator based on the challenge and the device public key, wherein generating the device authenticator comprises generating a message authentication code (MAC) over the challenge and a device nonce using the device public key;
transmit, via the interface, an authentication response to the network node, the authentication response comprising the device authenticator; and
receive, via the interface, an initial access response from the network node, the initial access response comprising an indicator of whether initial access is granted or denied.

28. The wireless device according to claim 27, wherein the authentication request further comprises a network authenticator; wherein the processor is configured to verify the authentication request based on the network authenticator, wherein the network authenticator provides a proof of the server's possession of the device public key; and wherein the processor is configured to proceed to generate the device authenticator upon successful verification.

29. The wireless device according to claim 27, wherein the processor is configured to generate the device authenticator by deriving a shared secret from the device public key; and by generating the device authenticator using the AKA protocol taking the challenge and the derived shared secret as input.

30. The wireless device according to claim 27, wherein the processor is configured to generate a device identifier by generating a temporary device network identifier based on the device identifier and wherein the processor is configured to transmit the temporary device network identifier to the network node.

31. The wireless device according to claim 28, wherein the processor is configured to verify the network authenticator according to an Authentication and Key Agreement, AKA, protocol using a shared secret derived from the device public key.

32. The wireless device according to claim 30, wherein the processor is configured to generate the temporary device network identifier by encoding the device identifier to match a network identifier format, wherein the network identifier format comprises a cellular network identifier format and/or a wireless local area network identifier format.

33. A network node for initial access of a wireless device to a network, the network node comprising:
   a first interface configured to communicate with the wireless device;
   a second interface configured to communicate with a first server storing a device public key of the wireless device and a second server;
   a memory unit; and
   a processor configured to:
      receive, via the interface, an initial access request from the wireless device;
      determine a device network identifier of the wireless device;
      obtain, from the second server, via the interface, authentication data corresponding to the device network identifier, the authentication data comprising a challenge;
      transmit, via the interface, an authentication request to the wireless device, the authentication request comprising the challenge;
      receive, via the interface, an authentication response from the wireless device, the authentication response comprising a device authenticator that includes a message authentication code (MAC) generated over the challenge and a device nonce using the device public key;
      verify the received authentication response based on the device authenticator and the authentication data; and upon successful verification:
      transmit, via the interface, an initial access response to the wireless device.

34. The network node according to claim 33, wherein the processor is configured to determine the device network identifier by receiving a device identifier from the wireless device; and requesting from an identity register the device network identifier using the device identifier.

35. The network node according to claim 33, wherein the authentication data further comprises a network authenticator, wherein the network authenticator provides a proof of the first server's possession of the device public key, and wherein the authentication request further comprises the network authenticator.

36. The network node according to claim 33, wherein the processor is configured to obtain the authentication data corresponding to the device network identifier by requesting the authentication data corresponding the device network identifier from an authentication server and receiving the authentication data from the authentication server.

37. The network node according to claim 34, wherein the device identifier is a temporary device network identifier.

38. A nontransitory computer readable storage medium comprising program code for performing a method when said program code is run on a processor of a wireless device, wherein the method is for obtaining initial access to a network in order to establish a connection to a server connected to the network, the wireless device storing a device public key and a device private key, the server storing the device public key, the method comprising:
   transmitting an initial access request to a network node of the network;
   receiving an authentication request from the network node, the authentication request comprising a challenge;
   generating a device authenticator based on the challenge and the device public key, wherein generating the device authenticator comprises generating a message authentication code (MAC) over the challenge and a device nonce using the device public key;
   transmitting an authentication response to the network node, the authentication response comprising the device authenticator; and
   receiving an initial access response from the network node, the initial access response comprising an indicator of whether the initial access has been granted or denied.

39. A nontransitory computer readable storage medium comprising program code for performing a method when said program code is run on a processor of a network node, wherein the method is for providing initial network access to a wireless device, the network node being connected to a first server storing a device public key of the wireless device and to a second server, the method comprising:
   receiving an initial access request from the wireless device;
   determining a device network identifier of the wireless device;
   obtaining, from the second server, authentication data corresponding to the device network identifier, the authentication data comprising a challenge;
   transmitting an authentication request to the wireless device, the authentication request comprising the challenge;
   receiving an authentication response from the wireless device, the authentication response comprising a device authenticator that includes a message authentication code (MAC) generated over the challenge and a device nonce using the device public key;
   verifying the received authentication response based on the device authenticator and the authentication data; and upon successful verification:
   transmitting an initial access response to the wireless device.

* * * * *